(12) United States Patent
Matsumura et al.

(10) Patent No.: US 12,114,178 B2
(45) Date of Patent: Oct. 8, 2024

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 191 days.

(21) Appl. No.: 17/279,934

(22) PCT Filed: Sep. 27, 2018

(86) PCT No.: PCT/JP2018/036120
§ 371 (c)(1),
(2) Date: Mar. 25, 2021

(87) PCT Pub. No.: WO2020/065883
PCT Pub. Date: Apr. 2, 2020

(65) Prior Publication Data
US 2021/0392514 A1 Dec. 16, 2021

(51) Int. Cl.
*H04W 16/28* (2009.01)
*H04B 7/08* (2006.01)
(Continued)

(52) U.S. Cl.
CPC ............ *H04W 16/28* (2013.01); *H04B 7/088* (2013.01); *H04W 72/1263* (2013.01); *H04W 72/20* (2023.01); *H04W 72/54* (2023.01)

(58) Field of Classification Search
CPC ............ H04W 16/28; H04W 72/1226; H04W 72/1263; H04W 72/1278; H04W 24/10; H04B 7/088; H04B 7/0695
See application file for complete search history.

(56) References Cited

U.S. PATENT DOCUMENTS

| | | | |
|---|---|---|---|
| 2016/0072565 A1* | 3/2016 | Yu | H04B 7/0619 |
| | | | 375/267 |
| 2017/0317866 A1* | 11/2017 | Stirling-Gallacher | H04B 7/088 |

(Continued)

OTHER PUBLICATIONS

"Further details on beam indication", 3GPP Draft; R1-1719806, 3rd Generation Partnership Project (3GPP), Mobile Competence Centre ; 650, Route Des Lucioles ; F-06921 Sophia-Antipolis Cedex; France, vol. RAN WG1, No. Reno, USA; Nov. 27, 2017-Dec. 1, 2017 Nov. 17, 2017 (Nov. 17, 2017).*

(Continued)

*Primary Examiner* — Harry H Kim
*Assistant Examiner* — Mohammed M Murshid
(74) *Attorney, Agent, or Firm* — Osha Bergman Watanabe & Burton LLP

(57) ABSTRACT

A user terminal according to an aspect of the present disclosure includes: a transmitting section that transmits a measurement result of a reference signal measured by applying a spatial domain filter; and a control section that assumes, when having low latency beam selection configured by higher layer signaling and receiving confirmation information regarding the measurement result at time T, that a spatial domain filter of a given channel after a time when a second time has elapsed from the time T is the same as a spatial domain filter corresponding to the latest measurement result transmitted before a time going back by a first time from the time T. According to an aspect of the present disclosure, a TCI-state of a channel, QCL assumption, or a beam can be switched at high speed.

4 Claims, 15 Drawing Sheets

(51) Int. Cl.
*H04W 72/1263* (2023.01)
*H04W 72/20* (2023.01)
*H04W 72/54* (2023.01)

(56) References Cited

U.S. PATENT DOCUMENTS

| | | | |
|---|---|---|---|
| 2019/0069258 A1* | 2/2019 | Jeon | H04W 56/0045 |
| 2019/0074886 A1* | 3/2019 | Yoon | H04B 17/318 |
| 2019/0174466 A1* | 6/2019 | Zhang | H04L 5/0057 |
| 2019/0223165 A1* | 7/2019 | Lyu | H04W 88/02 |
| 2019/0239093 A1* | 8/2019 | Zhang | H04L 5/001 |
| 2020/0280409 A1* | 9/2020 | Grant | H04L 5/0044 |
| 2021/0067289 A1* | 3/2021 | Zhu | H04B 7/088 |
| 2021/0168849 A1* | 6/2021 | Oh | H04W 72/23 |
| 2021/0314927 A1* | 10/2021 | Noh | H04L 5/0053 |

OTHER PUBLICATIONS

"Further details on beam indication", 3GPP Draft; R1-1719806, 3rd Generation Partnership Project (3GPP), Mobile Competence Centre ; 650, Route Des Lucioles ; F-06921 Sophia-Antipolis Cedex; France, vol. RAN WG1, No. Reno, USA; Nov. 27, 2017-Dec. 1, 2017 Nov. 17, 2017 (Year: 2017).*
Office Action issued in the counterpart Chinese Patent Application No. 201880099810.3, mailed on Jun. 7, 2023 (14 pages).
International Search Report issued in PCT/JP2018/036120 on Dec. 11, 2018 (2 pages).
Written Opinion of the International Searching Authority issued in PCT/JP2018/036120 on Dec. 11, 2018 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action issued in the counterpart Chinese Patent Application No. 201880099810.3, mailed on Jun. 7, 2023 (14 bages).

* cited by examiner

USER TERMINAL AND RADIO COMMUNICATION METHOD

TECHNICAL FIELD

The present disclosure relates to a user terminal and a radio communication method in a next-generation mobile communication system.

BACKGROUND ART

In the universal mobile telecommunications system (UMTS) network, long term evolution (LTE) has been specified for the purpose of further increasing a data rate, providing low latency, and the like (see Non-Patent Literature 1). In addition, LTE-Advanced (third generation partnership project (3GPP) Rel. (Release) 10-14) has been specified for the purpose of further increasing capacity and sophistication of LTE (3GPP Rel. 8 and 9).

Successor systems to LTE (for example, also referred to as 5th generation mobile communication system (5G), 5G+ (plus), new radio (NR), or 3GPP Rel. 15 or later) are also being studied.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

In a future radio communication system (hereinafter, also simply referred to as NR), it is being studied to determine a quasi-co-location (QCL) relation of a channel or a signal based on a transmission configuration indicator (TCI) state to control transmission/reception processing.

However, a TCI-state control method studied so far for Rel-15 NR requires a relatively long time to change the TCI-state and requires a communication overhead. Therefore, for example, in a case where the TCI-state needs to be changed frequently, a communication throughput may be reduced.

Therefore, one of objects of the present disclosure is to provide a user terminal and a radio communication method capable of switching a TCI-state of a channel, QCL assumption, or a beam at high speed.

Solution to Problem

A user terminal according to an aspect of the present disclosure includes: a transmitting section that transmits a measurement result of a reference signal measured by applying a spatial domain filter; and a control section that assumes, when having low latency beam selection configured by higher layer signaling and receiving confirmation information regarding the measurement result at time T, that a spatial domain filter of a given channel after a time when a second time has elapsed from the time T is the same as a spatial domain filter corresponding to the latest measurement result transmitted before a time going back by a first time from the time T.

Advantageous Effects of Invention

According to an aspect of the present disclosure, a TCI-state of a channel, QCL assumption, or a beam can be switched at high speed.

DESCRIPTION OF EMBODIMENTS (CORESET)

Figure 1:
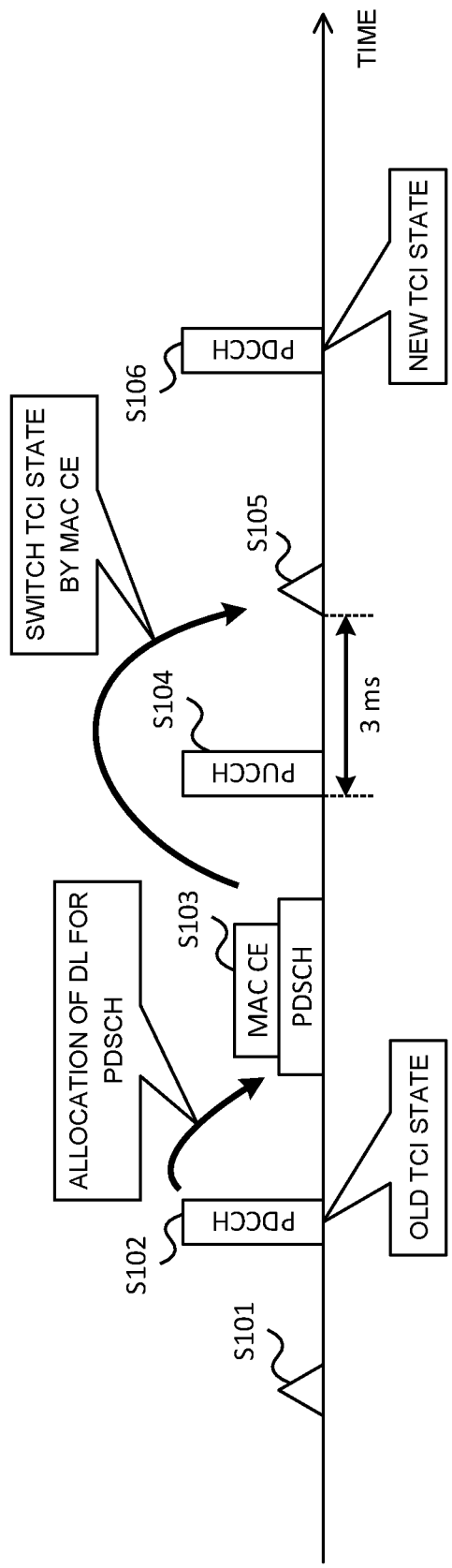
FIG. 1 is a diagram illustrating an example of beam management for PDCCH in Rel-15 NR.

In NR, in order to transmit a physical layer control signal (for example, downlink control information (DCI)) from a base station to a user equipment (UE), a control resource set (CORESET) is used.

CORESET is an allocation candidate area of a control channel (for example, physical downlink control channel (PDCCH)). CORESET may include a given frequency domain resource and time domain resource (for example, 1 or 2 OFDM symbol).

UE may receive CORESET configuration information (which may be referred to as CORESET configuration or coreset-Config) from a base station. UE can detect a physical layer control signal by monitoring CORESET configured in its own equipment.

Notification of CORESET configuration may be performed by, for example, higher layer signaling, and CORESET configuration may be represented by a given RRC information element (which may be referred to as "ControlResourceSet").

Here, the higher layer signaling may be, for example, any one of radio resource control (RRC) signaling, medium access control (MAC) signaling, and broadcast information, or a combination thereof.

For the MAC signaling, for example, a MAC control element (MAC CE) or a MAC protocol data unit (PDU) may be used. The broadcast information may be, for example, a master information block (MIB), a system information block (SIB), or remaining minimum system information (RMSI).

A given number of (for example, 3 or less) CORESETs may be configured for each bandwidth part (BWP) configured in UE in a serving cell.

A search area and a search method for PDCCH candidates are defined as a search space (SS). UE may receive search space configuration information (which may also be referred to as search space configuration) from a base station. Notification of search space configuration may be performed by, for example, higher layer signaling (RRC signaling or the like).

UE monitors CORESET based on search space configuration. UE can determine a correspondence between CORESET and a search space based on a CORESET-ID included in the search space configuration. One CORESET may be associated with one or more search spaces.

(QCL/TCI)

In NR, it is being studied to control reception processing (for example, at least one of reception, demapping, demodulation, and decoding) of at least one of a signal and a channel (expressed as a signal/channel) based on a transmission configuration indication state (TCI-state).

Here, the TCI-state is information regarding quasi-co-location (QCL) of a channel or a signal, and may also be referred to as a spatial Rx parameter, spatial relation info, or the like. The TCI-state may be configured in UE for each channel or each signal. UE may determine at least one of a transmission beam (Tx beam) and a reception beam (Rx beam) of a channel based on a TCI-state of a channel.

QCL is an index indicating a statistical property of a channel/signal. For example, when one signal/channel and another signal/channel have a QCL relation, this may mean that it is possible to assume that the plurality of different signals/channels have at least one identical property (a QCL relation is established regarding at least one of these) out of: Doppler shift, Doppler spread, average delay, delay spread, and spatial parameter (for example, spatial Rx parameter).

Note that the spatial Rx parameter may correspond to a reception beam of UE (for example, reception analog beam), and the beam may be specified based on spatial QCL. QCL (or at least one element of QCL) in the present disclosure may be replaced with spatial QCL (sQCL).

A plurality of types of QCL (QCL types) may be defined. For example, four QCL types A to D with different parameters (or parameter sets) that can be assumed to be identical may be provided. These parameters are as follows:

QCL type A: Doppler shift, doppler spread, average delay, and delay spread;
QCL Type B: Doppler shift and doppler spread;
QCL type C: Doppler shift and average delay; and
QCL type D: spatial Rx parameter.

The TCI-state may be, for example, information regarding QCL of a target channel (or a reference signal (RS) for the channel) and another signal (for example, another downlink reference signal (DL-RS). The TCI-state may be configured (indicated) by higher layer signaling, physical layer signaling, or a combination thereof.

In the present disclosure, higher layer signaling may be, for example, any one of radio resource control (RRC) signaling, medium access control (MAC) signaling, and broadcast information, or a combination thereof.

For the MAC signaling, for example, a MAC control element (MAC CE) or a MAC protocol data unit (PDU) may be used. The broadcast information may be, for example, a master information block (MIB), a system information block (SIB), remaining minimum system information (RMSI), or other system information (OSI).

The physical layer signaling may be, for example, downlink control information (DCI).

A channel for which a TCI-state is configured (specified) may be, for example, at least one of a physical downlink shared channel (PDSCH), a physical downlink control channel (PDCCH), a physical uplink shared channel (PUSCH), and a physical uplink control channel (PUCCH).

RS having a QCL relation with the channel may be, for example, at least one of a synchronization signal block (SSB), a channel state information reference signal (CSI-RS), and a sounding reference signal (SRS). SSB is a signal block including at least one of a primary synchronization signal (PSS), a secondary synchronization signal (SSS), and a physical broadcast channel (PBCH). SSB may be referred to as an SS/PBCH block.

An information element in a TCI-state configured by higher layer signaling ("TCI-state IE" of RRC) may include one or more pieces of QCL information ("QCL-Info"). The QCL-Info may include at least one of information regarding DL-RS having a QCL relation (DL-RS related information) and information indicating a QCL type (QCL type information). The DL-RS related information may include information such as an index of DL-RS (for example, an SSB index or a non-zero power CSI-RS resource ID), an index of a cell where RS is located, or an index of a bandwidth part (BWP) where RS is located.

Information regarding PDCCH (or DMRS antenna port associated with PDCCH) and QCL with a given DL-RS may be referred to as a TCI-state for PDCCH.

UE may determine a TCI-state for UE-specific PDCCH (CORESET) based on RRC signaling and MAC CE.

For example, for UE, one or more (K) TCI-states may be configured by higher layer signaling (ControlResourceSet information element) for each CORESET. UE may activate one or more TCI-states for each CORESET using MAC CE. The MAC CE may be referred to as a TCI-state indication for UE-specific PDCCH MAC CE. UE may monitor CORESET based on an active TCI-state corresponding to the CORESET.

A TCI-state may correspond to a beam. For example, UE may assume that PDCCHs with different TCI-states are transmitted using different beams.

Information regarding PDSCH (or DMRS antenna port associated with PDSCH) and QCL with a given DL-RS may be referred to as a TCI-state for PDSCH.

UE may be notified of M (M 1) TCI-states for PDSCH (QCL-Info for M PDSCHs) by higher layer signaling (M (M≥1) TCI-states for PDSCH (QCL-Info for M PDSCHs) may be configured by higher layer signaling). Note that the number M of TCI-states configured for UE may be limited by at least one of UE capability and a QCL type.

DCI used for scheduling PDSCH may include a given field (which may be referred to as, for example, a field for TCI, a TCI field, or a TCI-state field) indicating a TCI-state (QCL-Info for PDSCH). The DCI may be used for scheduling PDSCH of one cell, and may be referred to as, for example, DL DCI, DL assignment, DCI format 1_0, or DCI format 1_1.

When DCI includes an x-bit (for example, x=3) TCI field, a base station may preliminarily configure, for UE, up to $2^x$ (for example, eight when x=3) types of TCI-states using higher layer signaling. A value of the TCI field in DCI (TCI field value) may indicate one of the TCI-states preliminarily configured by higher layer signaling.

When more than eight types of TCI-states are configured for UE, MAC CE may be used to activate (or specify) eight or less TCI-states. The MAC CE may be referred to as a TCI-states activation/deactivation for UE-specific PDSCH MAC CE. A value of the TCI field in DCI may indicate one of the TCI-states activated by MAC CE.

UE may determine QCL of PDSCH (or DMRS port of PDSCH) based on a TCI-state indicated by a TCI field value in DCI. For example, by assuming that a DMRS port (or DMRS port group) of PDSCH of a serving cell has a QCL relation with DL-RS corresponding to the TCI-state whose notification has been performed by DCI, UE may control PDSCH reception processing (for example, decoding or demodulation).

(Beam Management)

By the way, in Rel-15 NR, a beam management (BM) method has been studied. In the beam management, it is being studied to perform beam selection based on an L1-RSRP reported by UE. Changing (switching) a beam of a signal/channel is equivalent to changing a TCL state (QCL) of the signal/channel.

Note that a beam selected by beam selection may be a transmission beam (Tx beam) or a reception beam (Rx beam). In addition, a beam selected by beam selection may be a beam of UE or a beam of a base station.

UE may report L1-RSRP using a physical uplink control channel (PUCCH) or a physical uplink shared channel (PUSCH) while L1-RSRP is included in CSI.

Note that CSI may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), L1-RSRP, and the like.

A measurement result (for example, CSI) reported for beam management may be referred to as beam measurement, beam measurement result, beam measurement report, beam report, or the like.

UE may measure a channel state using a resource for CSI measurement to derive L1-RSRP. The resource for CSI measurement may be, for example, at least one of an SS/PBCH block resource, a CSI-RS resource, and another reference signal resource. Configuration information of a CSI measurement report may be configured for UE using higher layer signaling.

The configuration information of the CSI measurement report (CSI-MeasConfig or CSI-ResourceConfig) may include information such as one or more non-zero power (NZP) CSI-RS resource sets (NZP-CSI-RS-ResourceSet) for CSI measurement, one or more zero power (ZP) CSI-RS resource sets (ZP-CSI-RS-ResourceSet) (or CSI-interference management (IM) resource sets (CSI-IM-ResourceSet)), or one or more SS/PBCH block resource sets (CSI-SSB-ResourceSet).

The information of each resource set may include information regarding repetition in a resource in the resource set. The information regarding the repetition may indicate, for example, 'on' or 'off'. Note that 'on' may be expressed as 'enabled' or 'valid', and 'off' may be expressed as 'disabled' or 'invalid'.

For example, for a resource set for which repetition is configured to be 'on', UE may assume that a resource in the resource set has been transmitted using the same downlink spatial domain transmission filter. In this case, UE may assume that a resource in the resource set has been transmitted using the same beam (for example, from the same base station using the same beam).

For a resource set for which repetition is configured to be 'off', UE may perform control such that UE should not assume (or does not have to assume) that a resource in the resource set has been transmitted using the same downlink spatial domain transmission filter. In this case, UE may assume that a resource in the resource set is not transmitted using the same beam (transmitted using a different beam). That is, UE may assume that a base station is performing beam sweeping for a resource set for which repetition is configured to be 'off'.

FIG. 1 is a diagram illustrating an example of beam management for PDCCH in Rel-15 NR. A network (NW, for example, base station) determines to switch a TCI-state for PDCCH of a UE (step S101). NW transmits DCI for scheduling PDSCH to the UE using PDCCH according to an old (pre-switching) TCI-state (step S102).

In addition, the base station transmits the PDSCH including the TCI-state indication for UE-specific PDCCH MAC CE (step S103).

When detecting the DCI, UE decodes the PDSCH and acquires the MAC CE. When receiving the MAC CE, UE transmits hybrid automatic repeat request acknowledgement (HARQ-ACK) for PDSCH that has provided the MAC CE (step S104). UE applies an activation command for a TCI-state based on the above MAC CE three milliseconds after a slot for transmitting the HARQ-ACK (step S105).

Thereafter, the base station transmits PDCCH according to a new (post-switching) TCI-state, and UE can receive and decode the PDCCH (step S106).

As described above, the TCI-state control method for PDCCH studied so far for Rel-15 NR requires a relatively long time to change the TCI-state. In addition, for another channel (PDSCH, PUCCH, or the like), it takes a relatively long time to change a TCI-state and communication overhead is required. Therefore, for example, in a case where a TCI-state needs to be changed frequently, delay required for the change is a problem, and a communication throughput may be reduced.

Therefore, the present inventors have conceived of a method for switching a TCI-state of a channel, QCL assumption, or a beam at high speed.

Hereinafter, embodiments according to the present disclosure will be described in detail with reference to the drawings. Radio communication methods according to the embodiments may be each applied independently, or may be applied in combination thereof.

(Radio Communication Method)
<Configuration of Low Latency Beam Selection>

In an embodiment, UE may assume that a TCI-state for PDCCH is not configured when low latency beam selection is configured by higher layer signaling.

Figure 2:
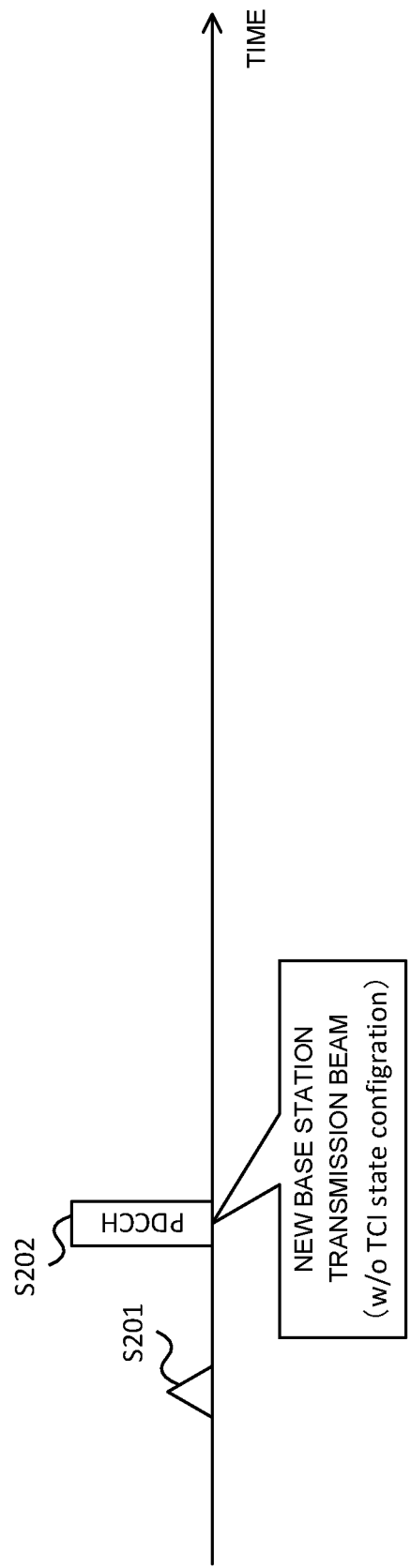
FIG. 2 is a diagram illustrating an example of low latency beam selection.

FIG. 2 is a diagram illustrating an example of low latency beam selection. NW determines to switch a TCI-state for PDCCH of a UE (step S201). After step S201, NW transmits PDCCH according to a new (post-switching) TCI-state to UE without transmitting PDCCH (DCI) according to an old TCI-state or transmitting PDSCH (MAC CE) as illustrated in FIG. 1 (step S202).

Note that low latency beam selection may be referred to as fast beam selection, beam selection w/o TCI-state, beam selection type II, TCI-state specification type 2, or the like.

Meanwhile, the TCI-state indication method using RRC+ MAC CE described for FIG. 1 may be referred to as high latency beam selection, slow beam selection, beam selection w TCI-state, beam selection type I, TCI-state specification type 1, Rel-15 beam selection, or the like.

UE may assume to follow high latency beam selection when low latency beam selection is not configured. In this case, UE can grasp a transmission beam of the base station when a TCI-state is configured for UE.

That is, UE can switch between low latency beam selection and high latency beam selection by higher layer signaling.

<PDCCH Reception Processing>

Even when a TCI-state is not configured as illustrated in FIG. 2, UE may decode PDCCH, for example, by attempting blind decoding of PDCCH for an assumed TCI-state. UE may perform PDCCH reception processing (demodulation, decoding, or the like) by assuming that a specific signal/channel (for example, at least one of configured SS/PBCH block and CSI-RS) has a QCL relation with DMRS of PDCCH.

UE with low latency beam selection configured may assume that UE reception beam for PDCCH is the same as a UE reception beam corresponding to the latest beam measurement result reported. UE with low latency beam selection configured may assume that a base station transmission beam for PDCCH is the same as a base station transmission beam corresponding to the latest beam measurement result reported by UE. In other words, UE with low latency beam selection configured may assume that a TCI-state for PDCCH is the same as a TCI-state corresponding to the latest beam measurement result reported (has a QCL relation with a signal/channel used for measurement corresponding to the latest beam measurement result reported).

Based on such assumptions, UE can monitor PDCCH (CORESET) using a specific UE reception beam without being notified of a TCI-state for PDCCH.

Note that "low latency beam selection is configured" in the present disclosure may be replaced with "low latency beam selection is configured and repetition in a resource in a resource set for CSI measurement is configured to be 'off'", "low latency beam selection is configured and a base station applies transmission beam sweeping in a resource for CSI measurement", or the like.

CORESET in the present disclosure may be replaced with at least one of a search space, a search space set, a PDCCH candidate, and the like.

Figure 3:
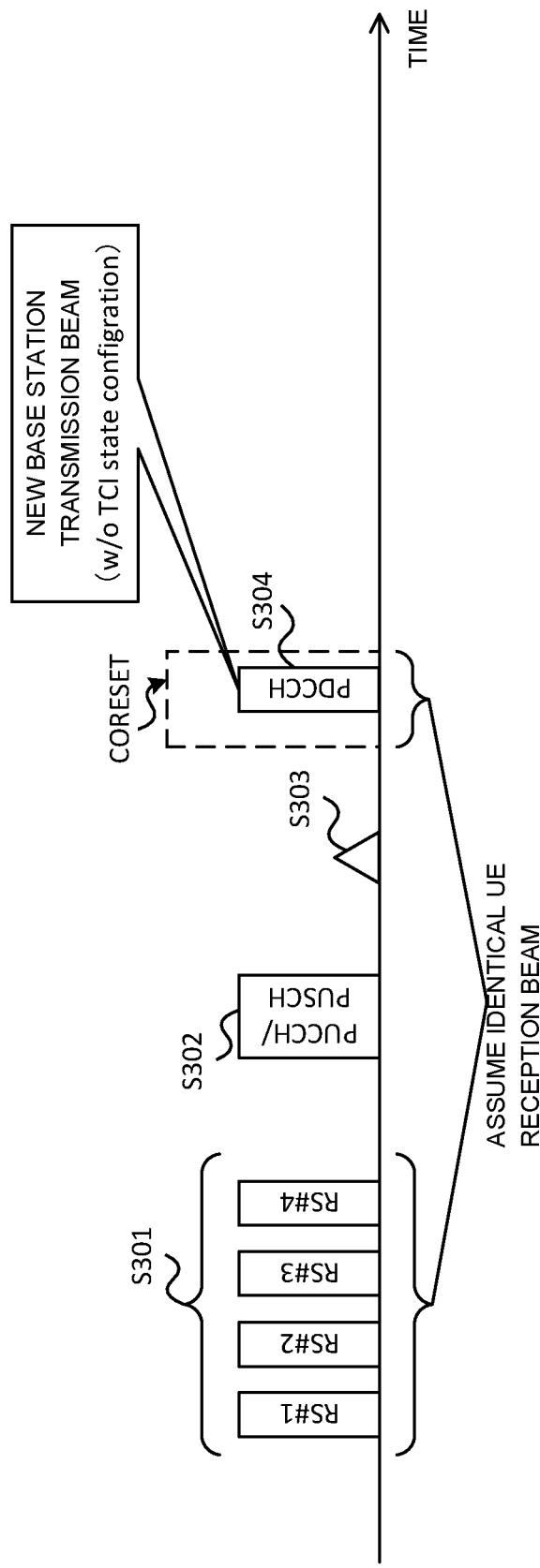
FIG. 3 is a diagram illustrating an example of beam management for PDCCH when low latency beam selection is configured.

FIG. 3 is a diagram illustrating an example of beam management for PDCCH when low latency beam selection is configured. UE assumes that low latency beam selection is configured and RS #1-#4 for which repetition is 'off' are further configured as a reference signal for CSI measurement.

The base station transmits RS #1-#4 to UE (step S301). The base station may apply transmission beam sweeping to the transmission of the RS. UE may assume the same UE reception beam for RS #1-#4 for which repetition is 'off' (may perform reception processing using the same UE reception beam).

UE transmits a measurement report (for example, CSI) based on the measurement result of RS #1-#4 using PUCCU or PUSCH (step S302). UE may transmit, for example, the best beam measurement result out of RS #1-R4. The measurement report will be described later.

The base station may determine to switch a TCI-state for PDCCH of UE at an arbitrary timing (step S303). The base station may transmit PDCCH transmitted by an arbitrary CORESET after step S303 using a new base station transmission beam (TCI-state) (step S304).

UE may use the same UE reception beam as the UE reception beam (UE reception beam used in step S301) corresponding to the latest beam measurement result reported in step S302 for reception of CORESET in step S304.

<Beam Measurement Report>

An example of the measurement report in step S302 will be described. UE may report (transmit) a measurement result (for example, CSI) by using PUCCH or PUSCH by performing at least one of channel quality measurement and interference measurement based on at least one of a resource for CSI measurement and a resource for interference measurement.

The resource for CSI measurement and the resource for interference measurement may be, for example, an SS/PBCH block resource, a CSI-RS resource, or the like. The base station may perform transmission or reception beam selection based on a result reported by UE. Hereinafter, the CSI measurement and the interference measurement are collectively referred to as CSI measurement.

CSI measurement/report in the present disclosure may be replaced with at least one of measurement/report for beam management, beam measurement/report, radio link quality measurement/report, and the like.

In addition, a result of channel quality measurement may include, for example, L1-RSRP.

In addition, a result of interference measurement may include a signal to interference plus noise ratio (SINR), a signal to noise ratio (SNR), reference signal received quality (RSRQ), and another index related to interference (for example, an arbitrary index other than L1-RSRP). Note that SINR, SNR, and RSRQ may be referred to as, for example, L1-SINR, L1-SNR, and L1-RSRQ, respectively.

When UE reports at least one of L1-RSRP, L1-RSRQ, L1-SINR, and a result of channel quality measurement, UE may report a given number of largest values (a given number of values from the largest). When UE reports at least one of results of interference measurement, UE may report a given number of smallest values (a given number of values from the smallest). Note that when UCI includes a plurality of values, one value and a difference between the one value and another value may be included.

UE may be notified of information regarding the given number using higher layer signaling, physical layer signaling, or a combination thereof. The given number may be, for example, 1, 2, or 4. The given number may be configured to be a different value between the report of channel quality measurement and the report of interference measurement.

UE may report a beam index (beam ID), a CSI measurement resource ID (for example, SSBRI or CRI), or a CSI measurement signal index (for example, SSB index or CSI-RS ID) corresponding to at least one of the given number of largest L1-RSRP, L1-RSRQ, L1-SINR, and result of channel quality measurement.

UE may report a beam index (beam ID), a CSI measurement resource ID (for example, SSBRI or CRI), or a CSI measurement signal index (for example, SSB index or CSI-RS ID) corresponding to at least one of the given number of smallest results of interference measurement.

A PUCCH or PUSCH resource may correspond to a beam index, a CSI measurement resource ID, or a CSI measurement signal index. UE may implicitly notify the base station of a beam index or the like by performing reporting using a specific PUCCH/PUSCH resource without explicitly reporting information regarding the beam index or the like.

For example, for UE, X (for example, eight) PUCCH/PUSCH resources corresponding to a CSI measurement beam/resource/ID may be configured by higher layer signaling. UE may transmit a CSI report using x (for example, two) resources corresponding to a beam/resource/ID as a report target among the X resources.

Note that the PUCCH/PUSCH resource configured for CSI reporting may correspond to at least one of a time resource, a frequency resource, a code resource (for example, cyclic shift or orthogonal cover code (OCC)), and the like.

Figure 4:
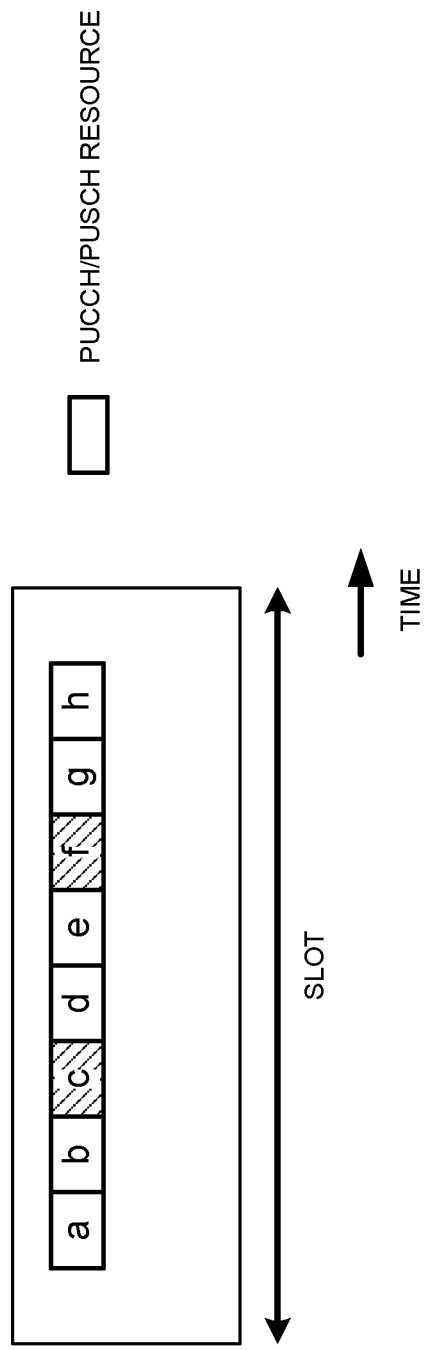
FIG. 4 is a diagram illustrating an example of a PUCCH or PUSCH resource for reporting a CSI measurement result.

FIG. 4 is a diagram illustrating an example of a PUCCH or PUSCH resource for reporting a CSI measurement result. In this example, for UE, eight PUCCH/PUSCH resources are configured for reporting, corresponding to a resource for CSI measurement. For example, the resources may be resources for scheduling request (SR) for PUCCH format 0.

The configured resources correspond to beams a to h, respectively. In FIG. 4, in order to report results of the beams c and f, UE performs transmission in SR resources corresponding thereto.

Note that "a given number of largest" described above may be replaced with "measurement result is equal to or more than a threshold value", "measurement result is equal to or more than a threshold value, and a given number of largest", and the like. "A given number of smallest" described above may be replaced with "measurement result is less than a threshold value", "measurement result is less than a threshold value, and a given number of smallest", and the like. Here, the threshold value may be configured by higher layer signaling or may be determined by specifications.

When UE reports more than one measurement results to the base station, how the base station determines a beam for the UE may depend on implementation of the base station.

<Channel to which Control that does not Configure TCI-State is Applied>

Low latency beam selection-related control of the present disclosure (for example, control that does not configure a TCI-state) may be applied only to PDCCH. This is because the above-described problem (latency) for beam selection is mainly related to PDCCH and it is assumed that beam selection of Rel-15 NR for another channel is functioning. In this case, complexity of UE implementation can be suppressed.

Control that does not configure a TCI-state may also be applied to PDSCH. In this case, UE may assume that PDCCH and PDSCH are transmitted from the base station using the same transmission beam. By not configuring a TCI-state in PDSCH, it is not necessary to give a notification of a TCI-state for PDSCH using DCI, MAC CE, or the like, and therefore communication overhead can be expected to be reduced.

Control that does not configure a TCI-state may also be applied to PUCCH. In this case, UE may assume that a transmission beam of PDCCH of the base station and a reception beam of PUCCH of the base station are the same beam.

Here, regarding PUCCH, one corresponding to a TCI-state may be expressed as a spatial relation. In Rel-15 NR, PUCCH configuration information (PUCCH-Config information element) of RRC can include spatial relation info between a given RS and PUCCH. The given RS is at least one of SSB, CSI-RS, and a sounding reference signal (SRS).

When spatial relation info about SSB or CSI-RS and PUCCH is configured, UE may transmit PUCCH using the same spatial domain filter as a spatial domain filter for receiving the SSB or CSI-RS. That is, in this case, UE may assume that a UE reception beam of SSB or CSI-RS and a UE transmission beam of PUCCH are the same.

When the spatial relation info about SRS and PUCCH is configured, UE may transmit PUCCH using the same spatial domain filter as a spatial domain filter for transmitting the SRS. That is, in this case, UE may assume that a UE transmission beam of SRS and a UE transmission beam of PUCCH are the same.

Note that a spatial domain filter for transmission of the base station, a downlink spatial domain transmission filter, and a transmission beam of the base station may be replaced with each other. A spatial domain filter for reception of the base station, an uplink spatial domain receive filter, and a reception beam of the base station may be replaced with each other.

A spatial domain filter for transmission of UE, an uplink spatial domain transmission filter, and a transmission beam of UE may be replaced with each other. A spatial domain filter for reception of UE, a downlink spatial domain receive filter, and a reception beam of UE may be replaced with each other.

When more than one piece of spatial relation info regarding PUCCH is configured, PUCCH spatial relation activation/deactivation MAC CE performs control such that one PUCCH spatial relation is active with respect to one PUCCH resource at a given time.

The MAC CE may include information such as a serving cell ID, a BWP ID, or a PUCCH resource ID as an application target.

UE may apply the corresponding configuration of the spatial domain filter based on the MAC CE for PUCCH transmission three milliseconds after a slot for transmitting HARQ-ACK for PDSCH that has provided the MAC CE.

By not configuring a spatial relation in PUCCH, it is not necessary to give a notification (activation) of a spatial relation for PUCCH using MAC CE or the like, and therefore communication overhead can be expected to be reduced.

A specific example will be described below.

[Control that does not Configure TCI-State in PDSCH]

UE may assume that PDCCH and PDSCH are transmitted from the base station using the same transmission beam when low latency beam selection is configured by higher layer signaling.

When PDSCH is subjected to semi-static resource allocation (for example, in a case of semi-persistent scheduling (SPS) PDSCH), UE may assume that the base station transmission beam of the PDSCH and the base station transmission beam of the most recent PDCCH (CORESET) are the same.

When PDSCH is subjected to dynamic resource allocation, UE may assume that the base station transmission beam of the PDSCH and the base station transmission beam of PDCCH (CORESET) that schedules the PDSCH are the same.

UE may assume that PDCCH and PDSCH are received using the same UE reception beam when low latency beam selection is configured by higher layer signaling.

When PDSCH is subjected to semi-static resource allocation, UE may receive the PDSCH using the UE reception beam for the most recent PDCCH (CORESET).

When PDSCH is subjected to dynamic resource allocation, UE may receive the PDSCH using the UE reception beam for PDCCH (CORESET) that schedules the PDSCH.

UE may assume that a TCI field contained in DCI is 0 bits when low latency beam selection is configured. For example, the TCI field in DCI format 1_1 may be 0 bits when a higher layer parameter (tci-PresentInDCI) indicating that the DCI includes the TCI field is not enabled or a higher layer parameter indicating low latency beam selection is enabled.

Even when more than eight TCI-states are configured by higher layer signaling, UE may assume that there is no notification of TCI-states activation/deactivation for UE-specific PDSCH MAC CE (MAC CE for beam selection of PDSCH) when low latency beam selection is configured (reception of the MAC CE does not have to be expected).

Figure 5:
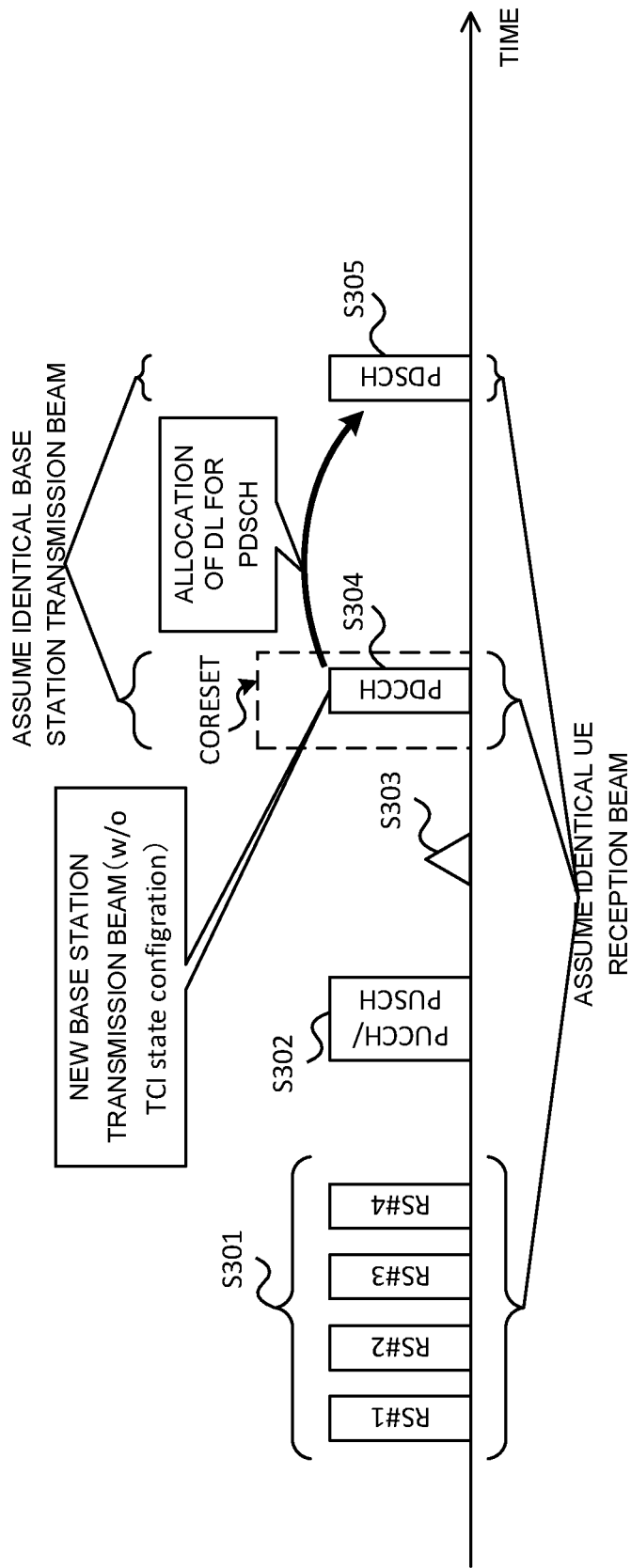
FIG. 5 is a diagram illustrating an example of beam management for PDSCH when low latency beam selection is configured.

FIG. 5 is a diagram illustrating an example of beam management for PDSCH when low latency beam selection is configured. Since steps S301 to S304 may be similar to the example of FIG. 3, duplicate description will be omitted. In this example, it is assumed that UE has detected DCI that schedules PDSCH in PDCCH in step S304.

UE performs PDSCH reception processing based on the DCI (step S305). UE may assume that the base station transmission beam of PDSCH in step S305 and the base station transmission beam of PDCCH in step S304 are the same.

UE may assume that the UE reception beam of PDSCH in step S305 and the UE reception beam of PDCCH in step S304 are the same.

Furthermore, when a TCI-state is not configured in PDCCH, UE may assume that the UE reception beam of PDSCH in step S305, the UE reception beam of PDCCH in step S304, and the UE reception beam (UE reception beam used in step S301) corresponding to the latest beam measurement result reported in step S302 are the same.

[Control that does not Configure TCI-State in PUCCH]

UE may assume that the base station uses the same beam (same transmission/reception beam) for transmission/reception of PDCCH, PDSCH, and PUCCH when low latency beam selection is configured by higher layer signaling.

When PUCCH is subjected to semi-static resource allocation (for example, in a case of P-CSI reporting or SP-CSI reporting), UE may assume that the base station beam (reception beam) of the PUCCH and the base station beam (transmission beam) of the most recent PDCCH or PDSCH are the same.

When PUCCH is based on dynamic scheduling (for example, when HARQ-ACK for PDSCH scheduled by DL assignment is transmitted by PUCCH), UE may assume that the base station beam (reception beam) of the PUCCH and the base station beam (transmission beam) of at least one of PDSCH corresponding to the PUCCH and PDCCH that has scheduled the PDSCH are the same.

UE may assume that the reception beam of PDCCH and the transmission beam of PUCCH are the same when low latency beam selection is configured by higher layer signaling.

When PUCCH is subjected to semi-static resource allocation, UE may assume that the UE transmission beam of the PUCCH and the UE reception beam of the most recent PDCCH or PDSCH are the same.

When PUCCH is based on dynamic scheduling, UE may assume that the UE transmission beam of the PUCCH and the UE reception beam of at least one of PDSCH corresponding to the PUCCH and PDCCH that has scheduled the PDSCH are the same.

UE may assume that there is no notification of the PUCCH spatial relation activation/deactivation MAC CE when low latency beam selection is configured (reception of the MAC CE does not have to be expected).

Figure 6:
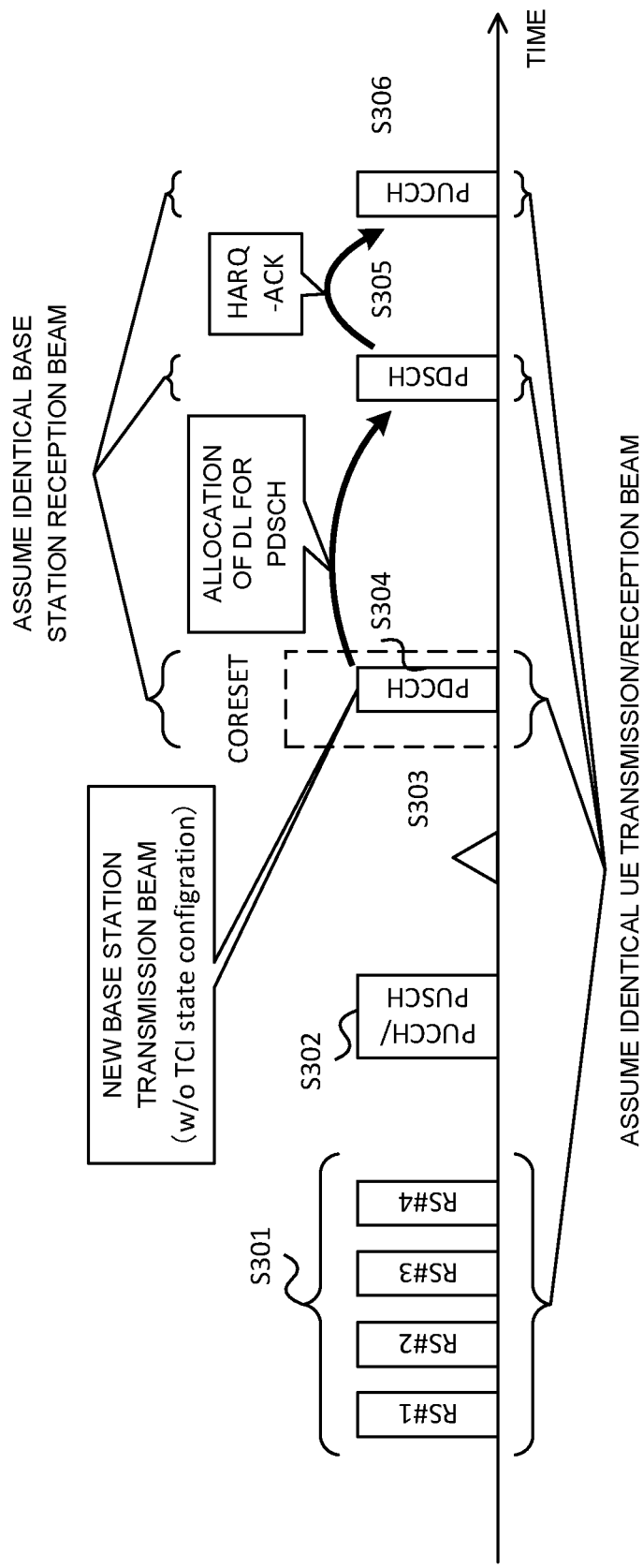
FIG. 6 is a diagram illustrating an example of beam management for PUCCH when low latency beam selection is configured.

FIG. 6 is a diagram illustrating an example of beam management for PUCCH when low latency beam selection is configured. Since steps S301 to S305 may be similar to the example of FIG. 5, duplicate description will be omitted.

UE transmits HARQ-ACK for PDSCH received in step S305 (step S306). UE may assume that the base station reception beam of PUCCH in step S306, the base station transmission beam of PDSCH in step S305, and the base station transmission beam of PDCCH in step S304 are the same.

UE may assume that the UE transmission beam of PUCCH in step S306, the UE reception beam of PDSCH in step S305, and the UE reception beam of PDCCH in step S304 are the same.

Furthermore, when a TCI-state is not configured in PDCCH, UE may assume that the UE transmission beam of PUCCH in step S306, the UE reception beam of PDSCH in step S305, the UE reception beam of PDCCH in step S304, and the UE reception beam (UE reception beam used in step S301) corresponding to the latest beam measurement result reported in step S302 are the same.

Figure 7:
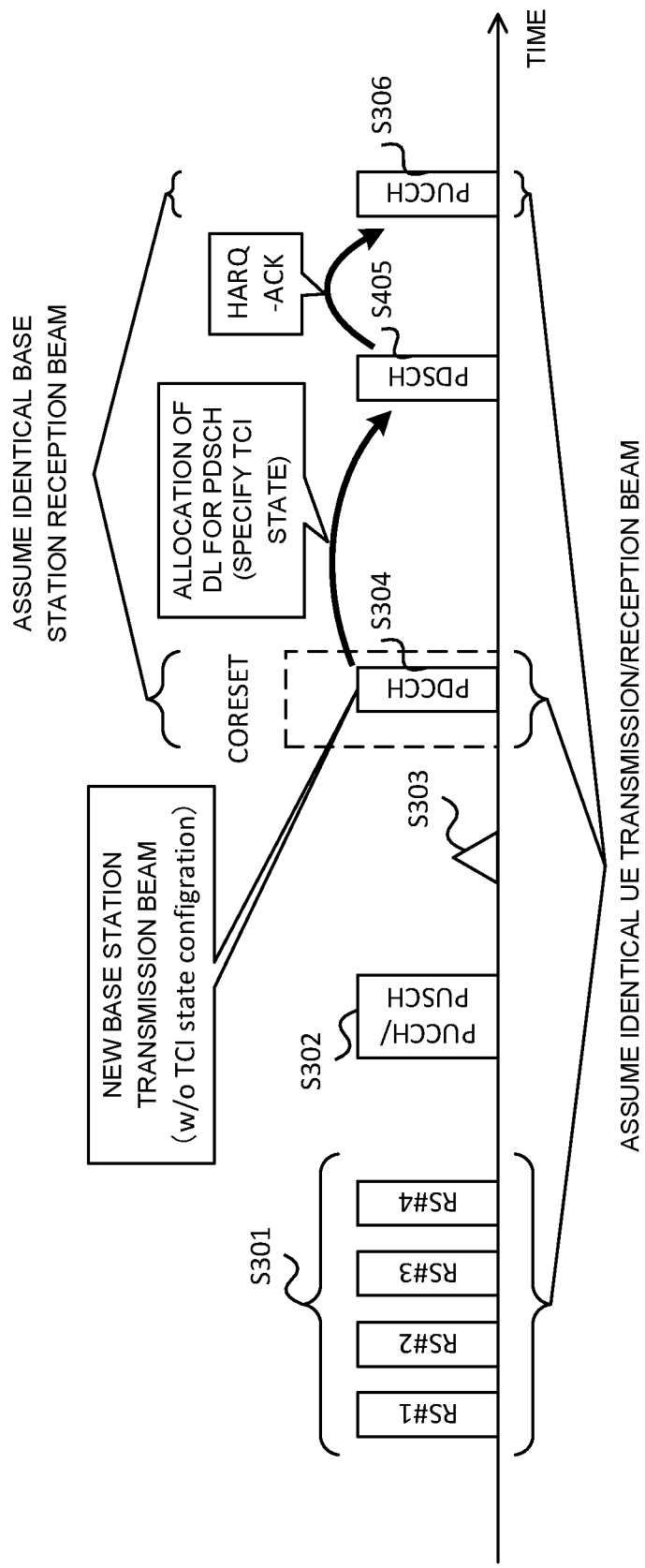
FIG. 7 is a diagram illustrating another example of beam management for PUCCH when low latency beam selection is configured.

FIG. 7 is a diagram illustrating another example of beam management for PUCCH when low latency beam selection is configured. Since steps S301 to S303 and S306 may be similar to the example of FIG. 6, duplicate description will be omitted. In this example, it is assumed that UE has detected DCI that schedules PDSCH in PDCCH in step S304. Note that, unlike the example of FIG. 6, the DCI includes a field that specifies a TCI-state for PDSCH.

UE performs PDSCH reception processing based on the DCI (step S405). UE does not have to assume or may assume that the base station transmission beam of PDSCH in step S405 and the base station transmission beam of PDCCH in step S304 are the same (FIG. 7 illustrates an example in which it is not assumed).

UE may assume that the base station reception beam of PUCCH in step S306 and the base station transmission beam of PDCCH in step S304 are the same.

UE may assume that the UE transmission beam of PUCCH in step S306 and the UE reception beam of PDCCH in step S304 are the same.

Furthermore, when a TCI-state is not configured in PDCCH, UE may assume that the UE transmission beam of PUCCH in step S306, the UE reception beam of PDCCH in step S304, and the UE reception beam (UE reception beam used in step S301) corresponding to the latest beam measurement result reported in step S302 are the same.

According to the embodiment described above, the TCI-state for PDCCH can be configured more flexibly.

<Modification>

[Modification of PDCCH Reception Processing]

Note that "the latest beam measurement result reported" in the assumption described in the above PDCCH reception processing may be limited to a specific type of CSI report. The specific type of CSI report may be, for example, any one of periodic CSI (P-CSI) report, aperiodic CSI (A-CSI)

report, and semi-permanent (semi-persistent) CSI (SP-CSI) report, or a combination thereof.

In this case, when the base station performs control so as to cause UE to perform a specific type of CSI report, UE's assumption about the reception beam (TCI-state) for PDCCH can be changed.

The "reception beam for PDCCH/base station transmission beam/TCI-state" in the above assumption may be "reception beam for PDCCH/base station transmission beam/TCI-state at time T", and in this case, "the latest . . . reported" in the above assumption may be replaced with "latest . . . reported at a time going back by $T_{offset}$ or more from time T". $T_{offset}$ may be defined based on time required for UE or the base station to switch beams (for example, a UE reception beam and a base station transmission beam).

Note that UE may be notified of information regarding $T_{offset}$ by using higher layer signaling, physical layer signaling, or a combination thereof.

Figure 8:
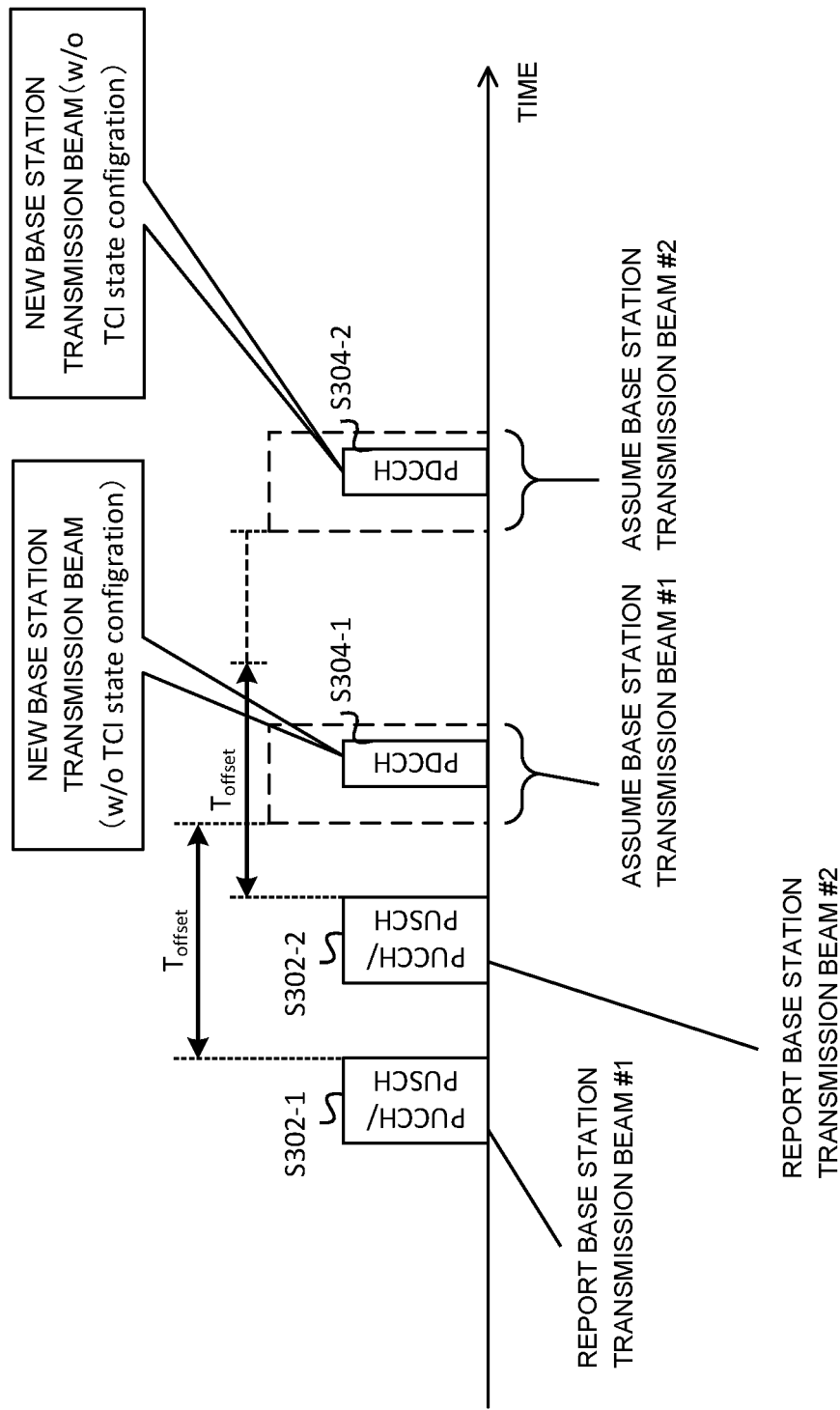
FIG. 8 is a diagram illustrating an example of assumption of a base station transmission beam of PDCCH based on $T_{offset}$.

FIG. 8 is a diagram illustrating an example of assumption of a base station transmission beam of PDCCH based on $T_{offset}$. Steps S302-1 and S302-2 are similar to step S302 described above, but are different therefrom in that S302-1 is a report regarding base station transmission beam #1 and S302-2 is a report regarding base station transmission beam #2.

Steps S304-1 and S304-2 are similar to step S304 described above, but are different therefrom in that UE assumes that base station transmission beam #1 is applied to PDCCH in S304-1 and base station transmission beam #2 is applied to PDCCH in S304-2.

This is because, at the time of step S304-1, the report of step S304-1 is the latest report transmitted at a time going back by $T_{offset}$ or more, but the report of step S304-2 is transmitted at a time within $T_{offset}$.

In addition, this is because, at the time of step S304-2, the report of step S304-2 is the latest report transmitted at a time going back by $T_{offset}$ or more.

Note that UE's assumption regarding the reception beam for PDCCH may be changed within a given CORESET duration.

Figure 9:
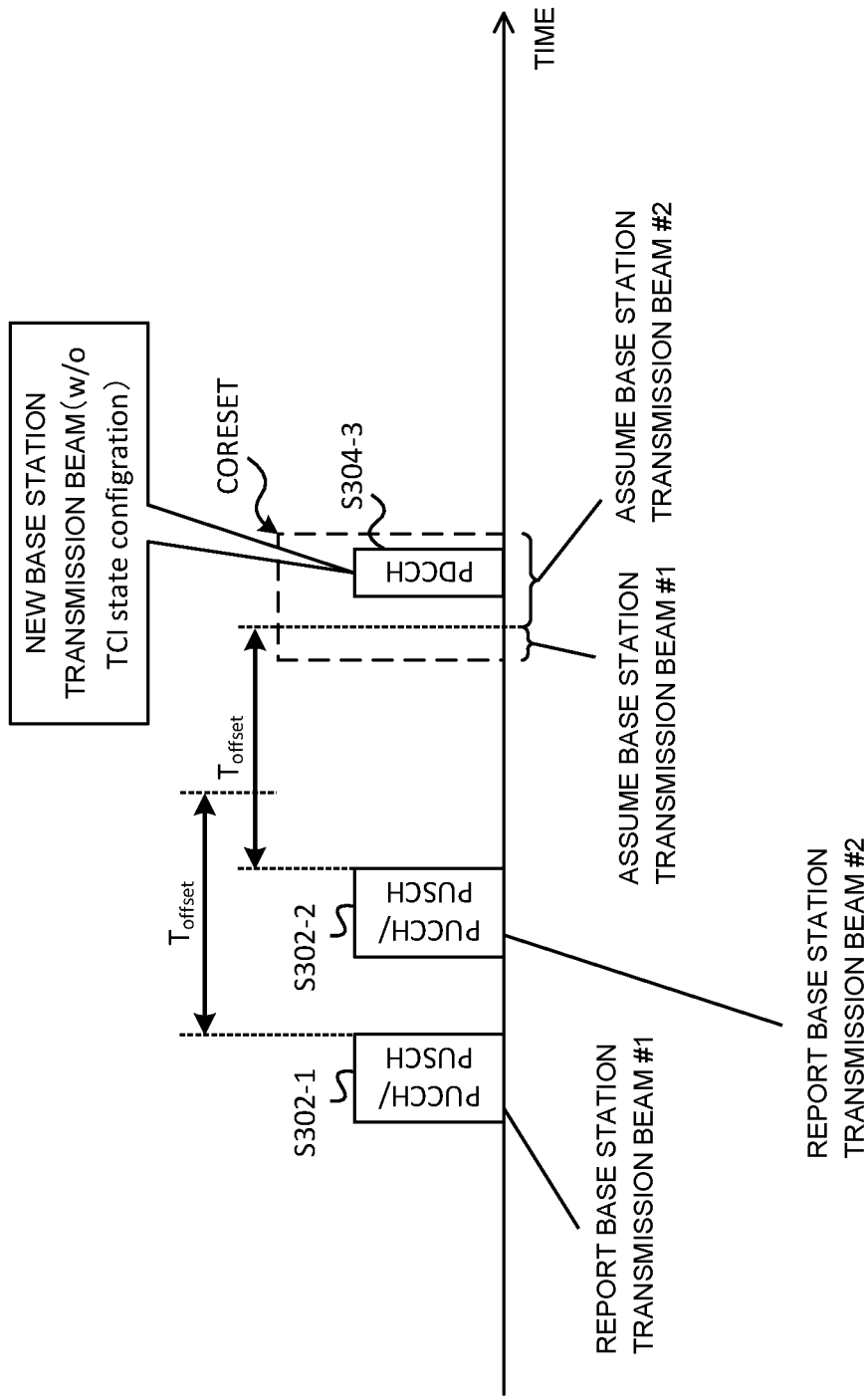
FIG. 9 is a diagram illustrating another example of assumption of a base station transmission beam of PDCCH based on $T_{offset}$.

FIG. 9 is a diagram illustrating another example of assumption of a base station transmission beam of PDCCH based on $T_{offset}$. In this example, step S304-3 is illustrated in which the temporal position of CORESET is different from that in FIG. 8.

In addition, step S304-3 is different from step S304 described above in that UE assumes that base station transmission beam #1 is applied to PDCCH halfway in CORESET of step S304-3 and base station transmission beam #2 is applied to subsequent PDCCH.

This is because, at the above time halfway in CORESET, the report of step S304-1 is the latest report transmitted at a time going back by $T_{offset}$ or more, but the report of step S304-2 is transmitted at a time within $T_{offset}$.

In addition, this is because, after the above time halfway in CORESET, the report of step S304-2 is the latest report transmitted at a time going back by $T_{offset}$ or more.

Figure 10:
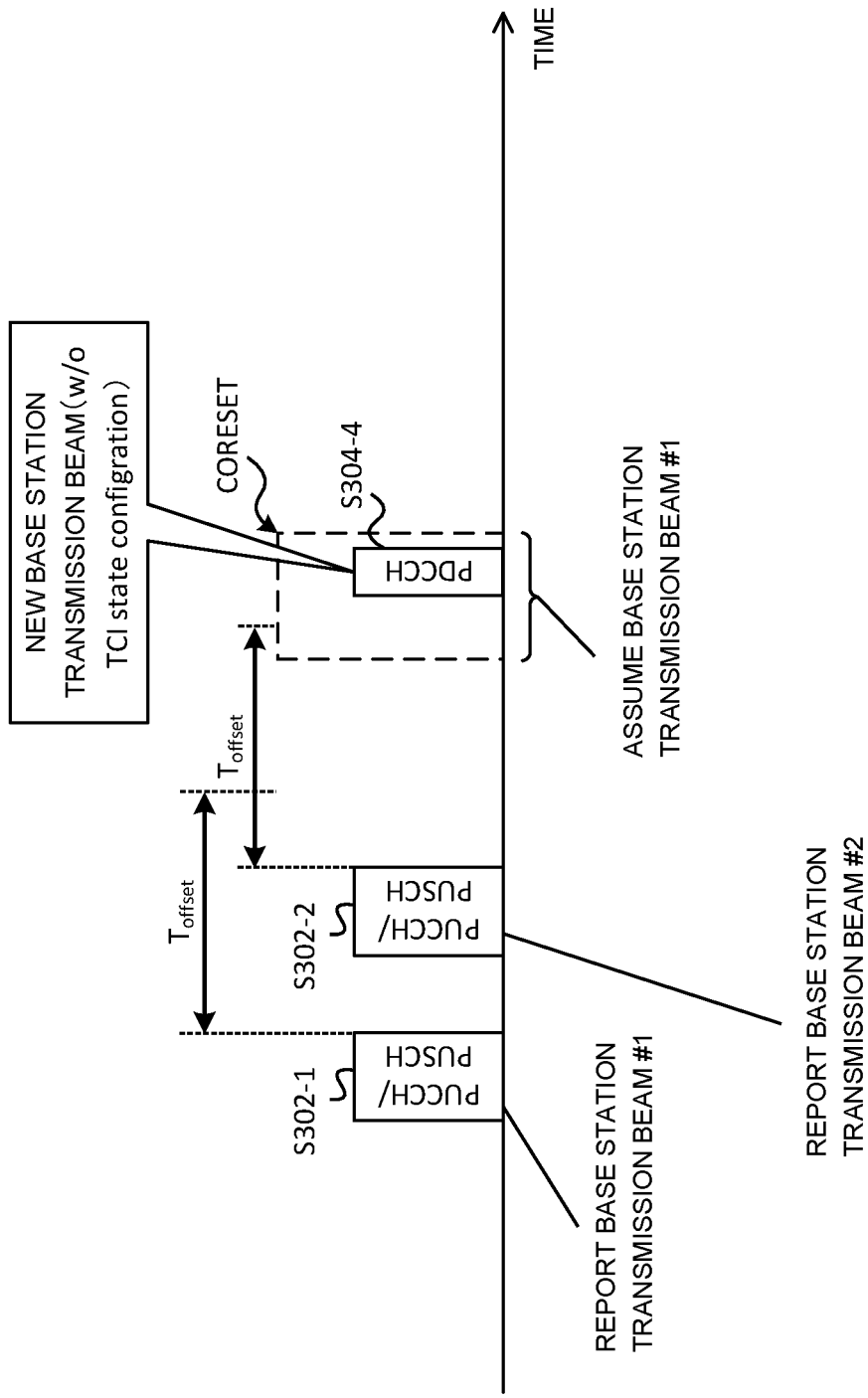
FIG. 10 is a diagram illustrating still another example of assumption of a base station transmission beam of PDCCH based on $T_{offset}$.

FIG. 10 is a diagram illustrating still another example of assumption of a base station transmission beam of PDCCH based on $T_{offset}$. In this example, an example similar to that in FIG. 9 is illustrated.

FIG. 10 is different from FIG. 9 in that UE does not change assumption of the base station transmission beam halfway in CORESET in step S304-3 in FIG. 9 (step S304-4). UE may assume that the base station transmission beam applied to PDCCH in the CORESET is base station transmission beam #1 corresponding to the report of step S304-1, which is the latest report transmitted at a time going back by $T_{offset}$ or more from the time of the starting position (for example, starting symbol or starting slot) of the CORESET.

In this way, UE may assume that the base station transmission beam/UE reception beam of (PDCCH included in) CORESET starting after $T_{offset}$ from the report of the beam measurement result is the same as assumption of the base station transmission beam/UE reception beam corresponding to the beam measurement result. In this case, since switching between the base station transmission beam and the UE reception beam does not occur in CORESET, it is possible to suppress generation of transmission/reception beam switching time (time for which transmission/reception is disabled) in CORESET.

[Other $T_{offset}$]

When low latency beam selection is configured by higher layer signaling, UE may assume that the base station transmission beam of PDSCH at time T is the same as the (latest) base station transmission beam of PDCCH at a time going back by $T_{offset2}$ or more from time T.

When low latency beam selection is configured by higher layer signaling, UE may assume that the UE reception beam of PDSCH at time T is the same as the (latest) UE reception beam of PDCCH at a time going back by $T_{offset2}$ or more from time T.

When low latency beam selection is configured by higher layer signaling, UE may assume that the base station reception beam of PUCCH at time T is the same as at least one of the (latest) base station transmission beam of PDSCH and the (latest) base station transmission beam of PDCCH at a time going back by $T_{offset3}$ or more from time T.

When low latency beam selection is configured by higher layer signaling, UE may assume that the UE transmission beam of PUCCH at time T is the same as at least one of the (latest) UE reception beam of PDSCH and the (latest) UE reception beam of PDCCH at a time going back by $T_{offset3}$ or more from time T.

$T_{offset2}$, $T_{offset3}$, and the like may be defined based on time required for UE or the base station to switch beams (for example, a UE transmission beam and a base station reception beam). Note that UE may be notified of information regarding $T_{offset2}$, $T_{offset3}$, or the like by using higher layer signaling, physical layer signaling, or a combination thereof.

Note that, in the present disclosure, "assume" may mean that reception processing, transmission processing, measurement processing, and the like are performed by assumption.

<Confirmation Information for Updating QCL Assumptions in UE>

In each of the above embodiments, the example has been described in which UE with low latency beam selection configured unconditionally assumes that the UE reception beam or the base station transmission beam for PDCCH (or PDSCH) (or the UE transmission beam or the base station reception beam for PUCCH) is the same as the UE reception beam or the base station transmission beam corresponding to the latest beam measurement result reported by UE (for example, UE autonomously updates QCL assumption based on an L1-RSRP measurement result).

However, it is more preferable for UE to update QCL assumption when the base station successfully receives the beam measurement result in UE. This is because there is no discrepancy in QCL assumption of UE between the base station and UE. Note that it may be referred to as QCL assumption for UE to assume that a given CORESET, channel, or reference signal has a specific QCL (for example, QCL type D) relation with another CORESET, channel, or reference signal.

Therefore, signaling from the network (base station) may be used as confirmation information for updating QCL assumption in UE. UE may determine whether or not to update QCL assumption based on the latest beam measurement result according to the above confirmation information from the base station even when low latency beam selection is configured.

Confirmation information for updating QCL assumption may be referred to as beam report confirmation information, beam report receipt notification, QCL assumption update indication, or the like, and is also simply referred to as confirmation information below.

UE may assume that confirmation information is indicated by at least one of DCI and MAC signaling (for example, MAC CE).

When receiving confirmation information at time T, UE may update QCL assumption based on the latest beam measurement results before time T−T1. UE may update QCL assumption based on the latest beam measurement result before time T−T1 after a given time offset T2 elapses from the DCI reception.

That is, when UE has low latency beam selection configured by higher layer signaling and receives confirmation information at time T, UE may assume that a given channel (for example, PDCCH) after time T+T2 follows a new QCL (the base station transmission beam of the given channel is a new beam), and that the given channel before time T+T2 follows an old QCL (the base station transmission beam of the given channel is an old beam).

The "new QCL (beam)" referred to here may be a QCL (transmission beam) of the base station or a QCL (reception beam) of UE corresponding to the latest beam measurement result before time T−T1. The "old QCL (beam)" may be a QCL (transmission beam) of the base station or a QCL (reception beam) of UE assumed by UE before the latest beam measurement result before time T−T1 is transmitted.

Time T may be a starting position of a symbol or a slot that receives DCI (which may be replaced with PDCCH, PDCCH candidate, CORESET, or the like) including confirmation information or MAC signaling.

Confirmation information may include information for specifying a corresponding beam measurement result (a beam measurement result that has been successfully received by the base station) (for example, an index for a beam report). When receiving confirmation information, UE may assume that the base station has successfully received the latest beam measurement result before time T−T1.

At least one of the T1 and the T2 may be configured by higher layer signaling. Notification of at least one of the T1 and the T2 may be explicitly performed by confirmation information or may be implicitly performed. A relation between at least one of the T1 and the T2 and a given index is configured by higher layer signaling, notification of a value of the index is performed using DCI indicating confirmation information, and UE may thereby specify at least one of the T1 and the T2.

Note that T, T1, and T2 may be each represented by the number of specific time units (symbols, slots, subframes, and the like), a second unit, a quantity unit of seconds (for example, microsecond), or the like. A value of at least one of T1 and T2 may be defined by specifications for each subcarrier interval or numerology. When the value of at least one of T1 or T2 is defined by specifications, UE does not have to be notified of the at least one of T1 and T2.

Note that T1, T2, or T1+T2 may be the same value as at least one of $T_{offset}$, $T_{offset2}$, and $T_{offset3}$ described above, or may be determined based on at least one of $T_{offset}$, $T_{offset2}$, and $T_{offset3}$. Conversely, at least one of $T_{offset}$, $T_{offset2}$, and $T_{offset3}$ may be determined based on T1, T2, or T1+T2.

Figure 11:
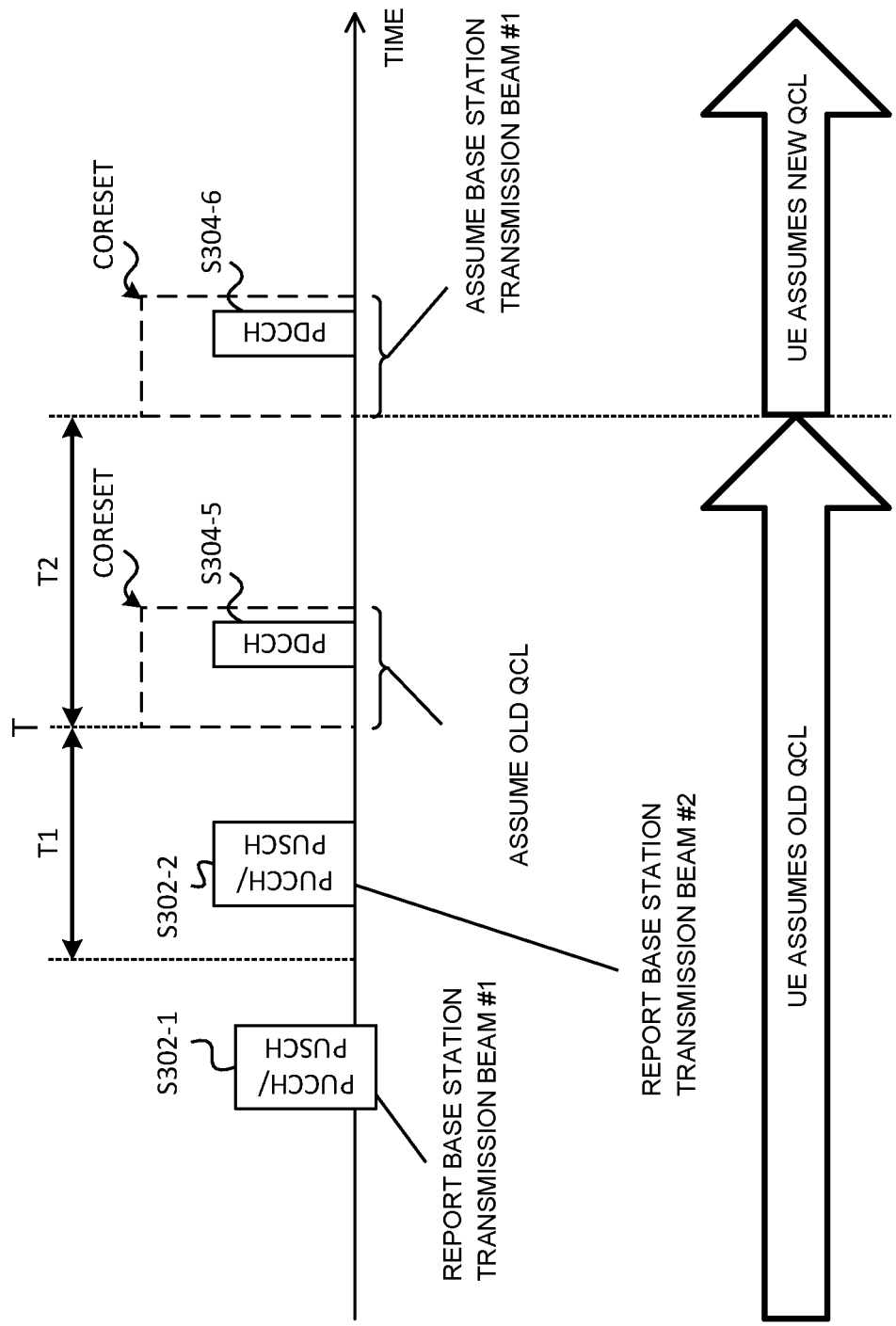
FIG. 11 is a diagram illustrating an example of changing QCL assumption based on confirmation information.

FIG. 11 is a diagram illustrating an example of changing QCL assumption based on confirmation information. Steps S302-1 and S302-2 may be similar to those in FIG. 8.

Steps S304-5 and S304-6 are similar to step S304 described above, but are different therefrom in that UE assumes that an old QCL (for example, base station transmission beam #0 or UE reception beam #0) is applied to PDCCH in S304-5, and that UE assumes that a new QCL (for example, base station transmission beam #1 or UE reception beam #1) is applied to PDCCH in S304-6.

UE receives DCI including confirmation information in step S304-5. At the time of step S304-5, a report in step S304-1 is the latest report before time T−T1. Therefore, UE follows a new QCL based on the report in step S304-1 after time T+T2.

Note that UE may start confirmation information timer, for example, in a MAC layer or a physical layer when receiving DCI including confirmation information. The timer may be a timer for measuring the length of the T2, and UE may perform control according to an old QCL while the timer is running. When the timer expires, UE may perform control according to a new QCL.

A change (update) of QCL assumption based on confirmation information may be applied to UE having UE capability of changing QCL based on the confirmation information. The base station may perform control to transmit confirmation information for UE that has reported the UE capability.

DCI indicating confirmation information may be DCI for scheduling PUSCH (for example, DCI format 0_0 or 0_1) or DCI for scheduling PDSCH (for example, DCI format 1_0 or 1_1).

DCI indicating confirmation information may include a field related to the confirmation information. The field may be a given number of bits (for example, 1). For example, UE may determine that the beam measurement result has not been received (or QCL assumption is not updated) if the value of the field is '0', and may determine that the beam measurement result has been successfully received (or QCL assumption is updated) if the value of the field is '1'.

DCI indicating confirmation information may correspond to DCI in which each of sets in a specific field has a specific value (value defined by specifications). The sets in the specific field may each include, for example, a field such as hybrid automatic repeat request (HARQ) process number (HPN), new data indicator (NDI), or redundancy version (RV).

UE may specify whether or not the DCI is DCI indicating confirmation information based on the content or type of the DCI.

For example, DCI falling under any one of the following may implicitly indicate not inclusion of confirmation information (UE that has received the DCI may assume that the DCI does not indicate confirmation information):
　DCI transmitted in a UE-specific search space set,
　non-fallback DCI,
　DCI format 0_1 or 1_1,
　a value related to a resource position where the DCI has been detected (for example, a value having a specific control channel element (CCE) index (for example, even number), and a value having a specific aggregation level of a PDCCH candidate that has detected the DCI (for example, even number).

Note that the DCIs listed above may implicitly indicate inclusion of confirmation information conversely.

For example, DCI falling under any one of the following may implicitly indicate not inclusion of confirmation information (UE that has received the DCI may assume that the DCI indicates confirmation information):

DCI transmitted in a common search space set,
fallback DCI,
DCI format 0_0 or 1_0,
a value related to a resource position where the DCI has been detected (for example, a value having a specific CCE index (for example, odd number), and
a value having a specific aggregation level of a PDCCH candidate that has detected the DCI (for example, odd number).

Note that the DCIs listed above may implicitly indicate not inclusion of confirmation information conversely.

UE may be notified of information regarding DCI implicitly indicating confirmation information by higher layer signaling. For example, for UE, it may be configured that a specific aggregation level in a specific search space corresponds to indication of confirmation information.

In addition, confirmation information may be indicated to UE by a sequence (code)-based method. For example, UE may determine confirmation information based on a DMRS cyclic shift (CS) index of at least one of PDCCH, PDSCH, and PUCCH.

UE may determine that confirmation information is not indicated (QCL assumption is not updated) when the CS index is a first value (#m). UE may determine that confirmation information is indicated (QCL assumption is updated) when the CS index is a second value (#m+n).

Here, the first value, the second value (or n), and the like may be configured for UE (UE may be notified of the first value, the second value (or n), and the like) by higher layer signaling, physical layer signaling, or a combination thereof, or may be determined by specifications. For example, n may be 6. The first value, the second value, and the like may be defined in a range of values.

[Change of QCL Assumption Before Reception of Confirmation Information]

UE may apply QCL assumption based on a beam measurement result when a given time (for example, referred to as T3) has elapsed from transmission of the beam measurement result. That is, when T3 has elapsed from the time when the beam measurement result is reported to the base station, UE may apply QCL assumption based on the beam measurement result even when UE has not received confirmation information from the base station. The value of T3 may be larger than, the same as, or smaller than the value of T1 or T2.

When UE has received confirmation information at time T after applying QCL assumption based on the beam measurement result, and QCL corresponding to the latest beam measurement result before time T−T1 is the same as the current QCL assumption, UE may maintain this assumption.

When UE has received confirmation information at time T after applying QCL assumption based on the beam measurement result, and QCL corresponding to the latest beam measurement result before time T−T1 is different from the current QCL assumption, UE may update QCL assumption based on the latest beam measurement result before time T−T1.

When UE does not receive confirmation information before a given time (for example, referred to as T4) elapses after UE transmits the beam measurement result, UE may restore the QCL assumption to the old QCL (beam) assumption after T4 elapses from the time when UE transmits the beam measurement result. In other words, even when UE switches the QCL assumption based on the beam measurement result once transmitted, when UE does not receive confirmation information indicating that this beam measurement result has been received from the base station, UE may restore the QCL assumption to the original QCL assumption.

Such control makes low latency beam selection in UE possible, and at the same time, makes it possible to deal with a case where a beam report does not reach the base station.

Note that in each of the embodiments described so far, the description has been made on the premise that low latency beam selection is configured for UE, but even when low latency beam selection is not explicitly configured, the radio communication method of each of the embodiments may be applied.

(Radio Communication System)

Hereinafter, a configuration of a radio communication system according to an embodiment of the present disclosure will be described. In this radio communication system, communication is performed using any one of the radio communication methods according to the embodiments of the present disclosure or a combination thereof.

Figure 12:
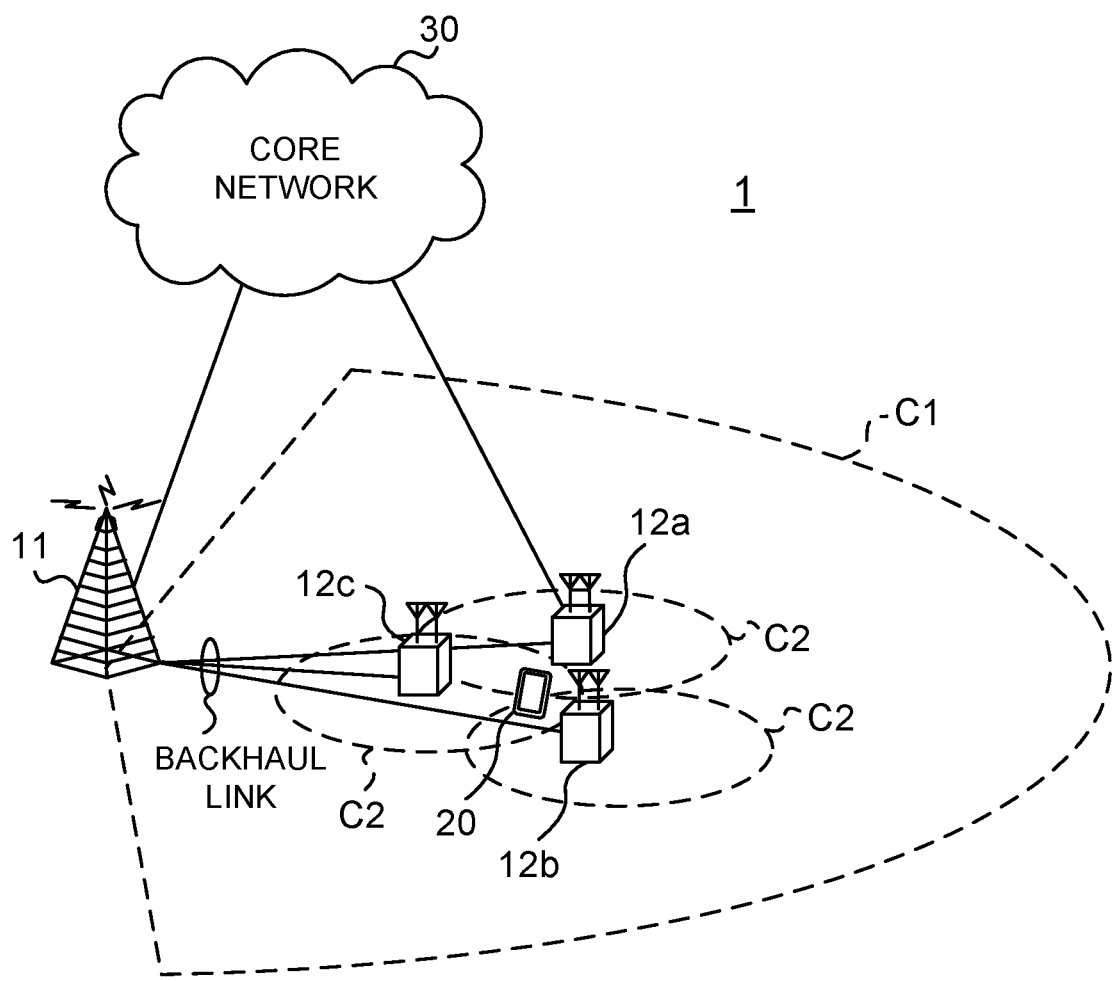
FIG. 12 is a diagram illustrating an example of a schematic configuration of a radio communication system according to an embodiment.

FIG. 12 is a diagram illustrating an example of a schematic configuration of a radio communication system according to an embodiment. A radio communication system 1 may be a system that implements communication using long term evolution (LTE), 5th generation mobile communication system new radio (5G NR), and the like specified by third generation partnership project (3GPP).

In addition, the radio communication system 1 may support dual connectivity between a plurality of radio access technologies (RATS) (multi-RAT dual connectivity (MR-DC)). MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In EN-DC, an LTE (E-UTRA) base station (eNB) is a master node (MN), and an NR base station (gNB) is a secondary node (SN). In NE-DC, an NR base station (gNB) is MN, and an LTE (E-UTRA) base station (eNB) is SN.

The radio communication system 1 may support dual connectivity between a plurality of base stations in identical RAT (for example, dual connectivity in which both MN and SN are NR base stations (gNB) (NR-NR dual connectivity (NN-DC)).

The radio communication system 1 may include a base station 11 that forms a macro cell C1 with a relatively wide coverage, and base stations 12 (12a to 12c) that are disposed within the macro cell C1 and that form small cells C2 narrower than the macro cell C1. A user terminal 20 may be located in at least one cell. The arrangement, number, and the like of cells and the user terminals 20 are not limited to the aspects illustrated in the drawings. Hereinafter the base stations 11 and 12 will be collectively referred to as "base stations 10" when the base stations 11 and 12 are not distinguished from each other.

The user terminal 20 may be connected to at least one of the plurality of base stations 10. The user terminal 20 may use at least one of carrier aggregation and dual connectivity (DC) using a plurality of component carriers (CC).

Each CC may be included in at least one of a frequency range 1 (FR1) and a frequency range 2 (FR2). The macro cell C1 may be included in FR1, and the small cell C2 may be included in FR2. For example, FR1 may be a frequency band of 6 GHz or less (sub-6 GHz), and FR2 may be a frequency band higher than 24 GHz (above-24 GHz). Note that the frequency bands, definitions, and the like of FR1 and FR2 are not limited to these, and for example, FR1 may be a frequency band higher than FR2.

The user terminal 20 may perform communication in each CC using at least one of time division duplex (TDD) and frequency division duplex (FDD).

The plurality of base stations 10 may be connected by wire (for example, an optical fiber or an X2 interface in compliance with common public radio interface (CPRI)) or by radio (for example, NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an LAB node.

A base station 10 may be connected to a core network 30 via another base station 10 or directly. The core network 30 may include, for example, at least one of evolved packet core (EPC), 5G core network (5GCN), next generation core (NGC), and the like.

The user terminal 20 may correspond to at least one of communication methods such as LTE, LTE-A, and 5G.

In the radio communication system 1, a radio access method based on orthogonal frequency division multiplexing (OFDM) may be used. For example, in at least one of downlink (DL) and uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that in the radio communication system 1, another radio access method (for example, another single carrier transmission method or another multi-carrier transmission method) may be used as the UL and DL radio access method.

In the radio communication system 1, as a downlink channel, a physical downlink shared channel (PDSCH) shared by the user terminals 20, a physical broadcast channel (PBCH), a physical downlink control channel (PDCCH), or the like may be used.

In the radio communication system 1, as an uplink channel, a physical uplink shared channel (PUSCH) shared by the user terminals 20, a physical uplink control channel (PUCCH), a physical random access channel (PRACH), or the like may be used.

PDSCH transmits user data, higher layer control information, system information block (SIB), and the like. PUSCH may transmit user data, higher layer control information, and the like. PBCH may transmit master information block (MIB).

PDCCH may transmit lower layer control information. The lower layer control information may include, for example, downlink control information (DCI) including scheduling information of at least one of PDSCH and PUSCH.

Note that DCI that schedules PDSCH may be referred to as DL assignment, DL DCI, or the like, and DCI that schedules PUSCH may be referred to as UL grant, UL DCI, or the like. Note that PDSCH may be replaced with DL data, and PUSCH may be replaced with UL data.

A control resource set (CORESET) and a search space may be used to detect PDCCH. CORESET corresponds to a resource that searches for DCI. The search space corresponds to a search area and a search method for PDCCH candidates. One CORESET may be associated with one or more search spaces. UE may monitor CORESET associated with a given search space based on search space configuration.

One SS may correspond to a PDCCH candidate corresponding to one or more aggregation levels. One or more search spaces may be referred to as a search space set. Note that "search space", "search space set", "search space configuration", "search space set configuration", "CORESET", "CORESET configuration", and the like in the present disclosure may be replaced with each other.

By means of PUCCH, channel state information (CSI), delivery confirmation information (for example, hybrid automatic repeat request acknowledgement (HARQ-ACK), which may be referred to as ACK/NACK or the like), scheduling request (SR), and the like may be transmitted. By means of PRACH, a random access preamble for establishing a connection with a cell may be transmitted.

Note that in the present disclosure, downlink, uplink, and the like may be expressed without "link". Various channels may be expressed without adding "physical" at the beginning thereof.

In the radio communication system 1, a synchronization signal (SS), a downlink reference signal (DL-RS), and the like may be transmitted. In the radio communication systems 1, a cell-specific reference signal (CRS), a channel state information reference signal (CSI-RS), a demodulation reference signal (DMRS), a positioning reference signal (PRS), a phase tracking reference signal (PTRS), and the like may be transmitted as DL-RS.

The synchronization signal may be, for example, at least one of a primary synchronization signal (PSS) and a secondary synchronization signal (SSS). A signal block including SS (PSS or SSS) and PBCH (and DMRS for PBCH) may be referred to as an SS/PBCH block, an SSB (SS Block), and the like. Note that SS, SSB, or the like may also be referred to as a reference signal.

In the radio communication system 1, a sounding reference signal (SRS), a demodulation reference signal (DMRS), and the like may be transmitted as an uplink reference signal (UL-RS). Note that DMRS may be referred to as a UE-specific reference signal.

(Base Station)

Figure 13:
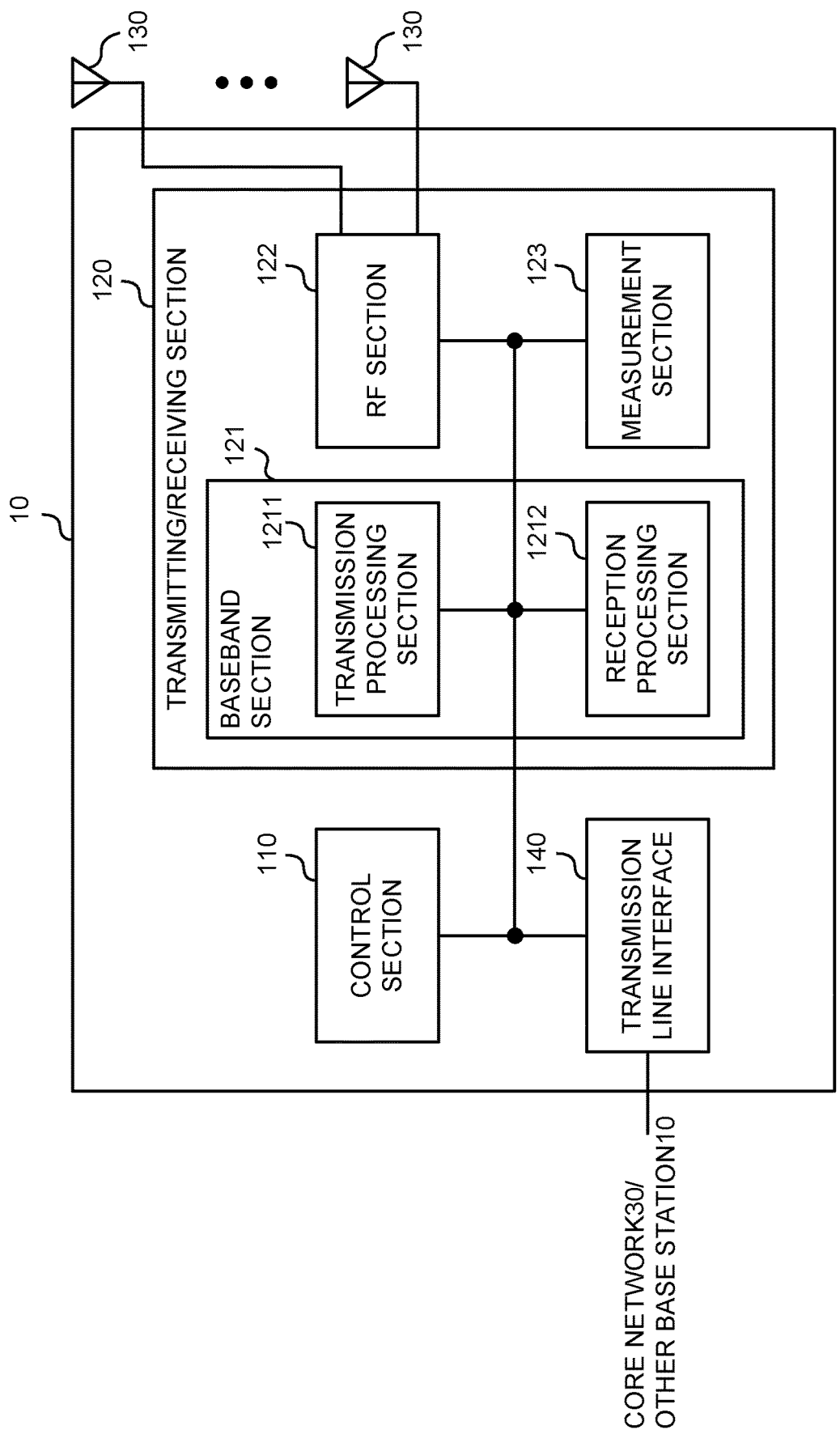
FIG. 13 is a diagram illustrating an example of a configuration of a base station according to an embodiment.

FIG. 13 is a diagram illustrating an example of a configuration of a base station according to an embodiment. The base station 10 includes a control section 110, a transmitting/receiving section 120, a transmitting/receiving antenna 130, and a transmission line interface 140. Note that one or more of the control sections 110, one or more of the transmitting/receiving sections 120, one or more of the transmitting/receiving antennas 130, and one or more of the transmission line interfaces 140 may be included.

Note that this example mainly describes a functional block which is a characteristic part of the present embodiment, and it may be assumed that the base station 10 also has another functional block necessary for radio communication. A part of processing of each section described below may be omitted.

The control section 110 controls the entire base station 10. The control section 110 can be constituted by a controller, a control circuit, or the like, which is described based on common recognition in the technical field to which the present disclosure relates.

The control section 110 may control signal generation, scheduling (for example, resource allocation or mapping), and the like. The control section 110 may control transmission/reception, measurement, and the like using the transmitting/receiving section 120, the transmitting/receiving antenna 130, and the transmission line interface 140. The control section 110 may generate data to be transmitted as a signal, control information, a sequence, and the like, and may transfer the data, the control information, the sequence, and the like to the transmitting/receiving section 120. The control section 110 may perform call processing (such as configuration or releasing) of a communication channel, management of the state of the base station 10, and management of a radio resource.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can be constituted by a transmitter/receiver, an RF circuit, a baseband circuit, a filter, a phase shifter, a measurement circuit, a transmission/reception circuit, and the like, which are described based on common recognition in the technical field to which the present disclosure relates.

The transmitting/receiving section 120 may be constituted as an integrated transmitting/receiving section, or may be constituted by a transmitting section and a receiving section. The transmitting section may be constituted by the transmission processing section 1211 and the RF section 122. The receiving section may be constituted by the reception processing section 1212, the RF section 122, and the measurement section 123.

The transmitting/receiving antenna 130 can be constituted by an antenna described based on common recognition in the technical field to which the present disclosure relates, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a transmission beam and a reception beam by using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like, for example, on data acquired from the control section 110 or control information to generate a bit string to be transmitted.

The transmitting/receiving section 120 (transmission processing section 1211) may perform transmission processing such as channel encoding (which may include error correction encoding), modulation, mapping, filtering processing, discrete Fourier transform (DFT) processing (if necessary), inverse fast Fourier transform (IFFT) processing, precoding, or digital-analog transform on the bit string to be transmitted, and may output a baseband signal.

The transmitting/receiving section 120 (RF section 122) may perform modulation to a radio frequency band, filtering processing, amplification, and the like on the baseband signal, and may transmit a signal in the radio frequency band via the transmitting/receiving antenna 130.

Meanwhile, the transmitting/receiving section 120 (RF section 122) may perform amplification, filtering processing, demodulation to a baseband signal, and the like on the signal in the radio frequency band received by the transmitting/receiving antenna 130.

The transmitting/receiving section 120 (reception processing section 1212) may apply reception processing such as analog-digital transform, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal to acquire user data and the like.

The transmitting/receiving section 120 (measurement section 123) may perform measurement on the received signal. For example, the measurement section 123 may perform radio resource management (RRM) measurement, channel state information (CSI) measurement, and the like based on the received signal. The measurement section 123 may measure received power (for example, reference signal received power (RSRP)), received quality (for example, reference signal received quality (RSRQ), signal to interference plus noise ratio (SINR), or signal to noise ratio (SNR)), signal strength (for example, received signal strength indicator (RSSI)), propagation path information (for example, CSI), and the like. The measurement result may be output to the control section 110.

The transmission line interface 140 may transmit/receive a signal (backhaul signaling) to and from an apparatus included in the core network 30, other base stations 10, and the like, and may acquire, transmit, and the like user data (user plane data), control plane data, and the like for the user terminal 20.

Note that the transmitting section and the receiving section of the base station 10 in the present disclosure may be constituted by at least one of the transmitting/receiving section 120, the transmitting/receiving antenna 130, and the transmission line interface 140.

Note that the transmitting/receiving section 120 may receive a measurement result (for example, beam measurement result or CSI) of a reference signal (for example, SSB or CSI-RS) measured by applying a spatial domain filter (for example, a downlink spatial domain receive filter) from the user terminal 20.

The transmitting/receiving section 120 may transmit PDCCH including DCI. The transmitting/receiving section 120 may transmit low latency beam selection configuration information, confirmation information regarding the above measurement result, and the like to the user terminal 20.

The control section 110 may perform control to use the same spatial domain filter for transmission of PDCCH and transmission/reception of a specific channel on the user terminal 20 for which low latency beam selection is configured by higher layer signaling.

The control section 110 may perform control to use the same downlink spatial domain transmission filter for transmission of PDCCH and transmission of PDSCH.

The control section 110 may perform control to use the same spatial domain transmission filter for transmission of PDCCH and reception of PUCCH.

The control section 110 may perform control to transmit PDCCH by using the same downlink spatial domain transmission filter as the downlink spatial domain transmission filter corresponding to the above-described received latest measurement result on the user terminal 20 for which low latency beam selection is configured by higher layer signaling.

The control section 110 may perform control to transmit PDSCH by using the same downlink spatial domain transmission filter as the downlink spatial domain transmission filter used for transmission of PDCCH.

The control section 110 may perform control to receive PUCCH by using the same uplink spatial domain receive filter as the downlink spatial domain transmission filter used for transmission of PDCCH.

(User terminal)

Figure 14:
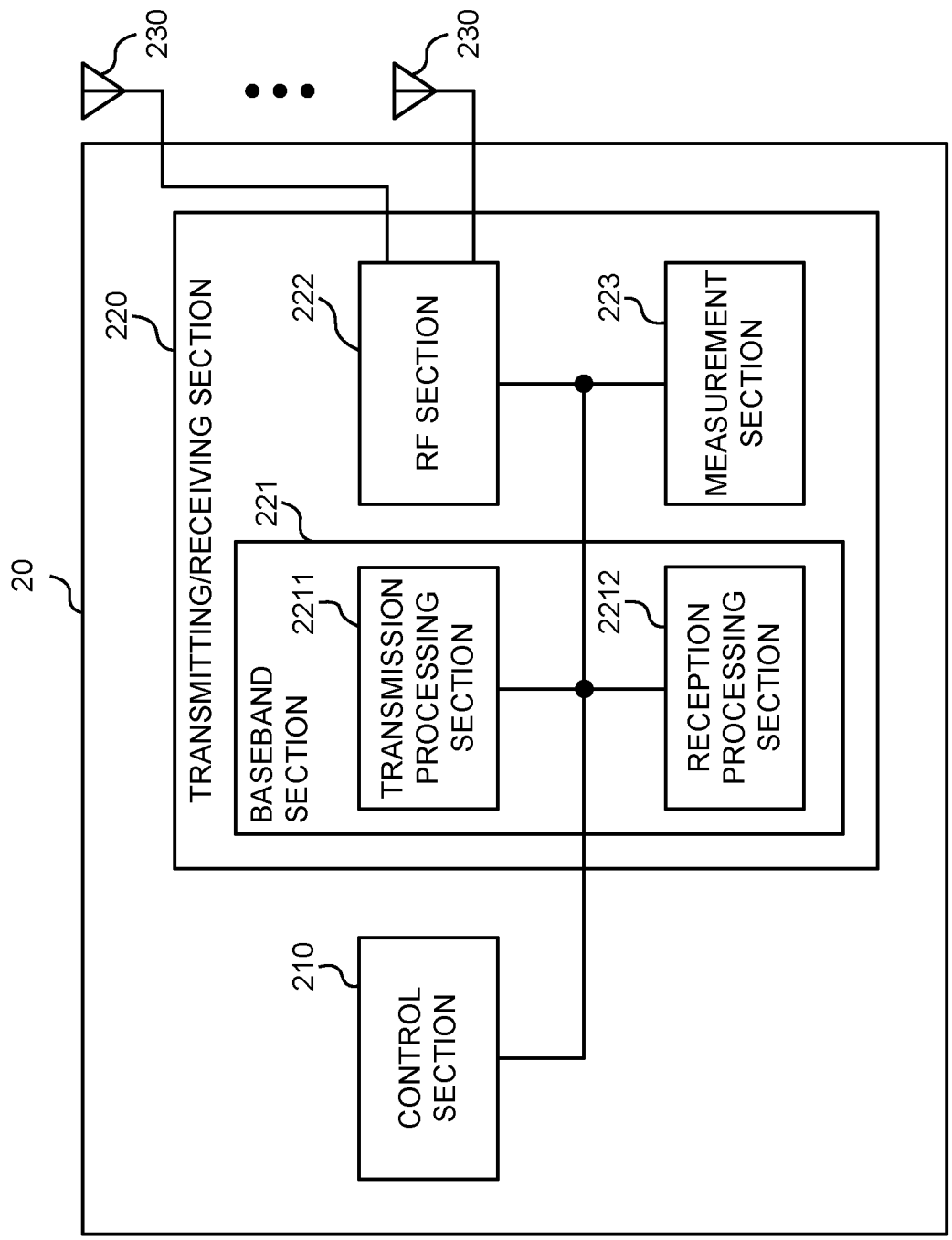
FIG. 14 is a diagram illustrating an example of a configuration of a user terminal according to an embodiment.

FIG. 14 is a diagram illustrating an example of a configuration of a user terminal according to an embodiment. The user terminal 20 includes a control section 210, a transmitting/receiving section 220, and a transmitting/receiving antenna 230. Note that one or more of the control sections 210, one or more of the transmitting/receiving sections 220, and one or more of the transmitting/receiving antennas 230 may be included.

Note that, although this example mainly describes a functional block which is a characteristic part of the present embodiment, it may be assumed that the user terminal 20 also has another functional block necessary for radio communication. A part of processing of each section described below may be omitted.

The control section 210 controls the entire user terminal 20. The control section 210 can be constituted by a controller, a control circuit, or the like, which is described based on common recognition in the technical field to which the present disclosure relates.

The control section 210 may control signal generation, mapping, and the like. The control section 210 may control transmission/reception, measurement, and the like using the transmitting/receiving section 220 and the transmitting/receiving antenna 230. The control section 210 may generate data to be transmitted as a signal, control information, a sequence, and the like, and may transfer the data, the control information, the sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted by a transmitter/receiver, an RF circuit, a baseband circuit, a filter, a phase shifter, a measurement circuit, a transmission/reception circuit, and the like, which are described based on common recognition in the technical field to which the present disclosure relates.

The transmitting/receiving section 220 may be constituted as an integrated transmitting/receiving section, or may be constituted by a transmitting section and a receiving section. The transmitting section may be constituted by the transmission processing section 2211 and the RF section 222. The receiving section may be constituted by the reception processing section 2212, the RF section 222, and the measurement section 223.

The transmitting/receiving antenna 230 can be constituted by an antenna described based on common recognition in the technical field to which the present disclosure relates, for example, an array antenna.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a transmission beam and a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like, for example, on data acquired from the control section 210 or control information to generate a bit string to be transmitted.

The transmitting/receiving section 220 (transmission processing section 2211) may perform transmission processing such as channel encoding (which may include error correction encoding), modulation, mapping, filtering processing, DFT processing (if necessary), IFFT processing, precoding, or digital-analog transform on a bit string to be transmitted, and may output a baseband signal.

Note that whether or not to apply DFT processing may be determined based on configuration of transform precoding. When transform precoding is enabled for a channel (for example, PUSCH), the transmitting/receiving section 220 (transmission processing section 2211) may perform DFT processing as the transmission processing in order to transmit the channel using a DFT-s-OFDM waveform. When transform precoding is not enabled for a channel (for example, PUSCH), the transmitting/receiving section 220 (transmission processing section 2211) does not have to perform DFT processing as the transmission processing.

The transmitting/receiving section 220 (RF section 222) may perform modulation to a radio frequency band, filtering processing, amplification, and the like on the baseband signal, and may transmit a signal in the radio frequency band via the transmitting/receiving antenna 230.

Meanwhile, the transmitting/receiving section 220 (RF section 222) may perform amplification, filtering processing, demodulation to a baseband signal, and the like on the signal in the radio frequency band received by the transmitting/receiving antenna 230.

The transmitting/receiving section 220 (reception processing section 2212) may acquire user data and the like by applying reception processing such as analog-digital transform, FFT processing, IDFT processing (if necessary), filtering processing, demapping, demodulation, decoding (which may include error correction decoding), MAC layer processing, RLC layer processing, or PDCP layer processing on the acquired baseband signal.

The transmitting/receiving section 220 (measurement section 223) may perform measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmitting section and the receiving section of the user terminal 20 in the present disclosure may be constituted by at least one of the transmitting/receiving section 220, the transmitting/receiving antenna 230, and the transmission line interface 240.

Note that the transmitting/receiving section 220 may transmit a measurement result (for example, beam measurement result or CSI) of a reference signal (for example, SSB or CSI-RS) measured by applying a spatial domain filter (for example, a downlink spatial domain receive filter) to the base station 10.

The transmitting/receiving section 220 may receive PDCCH including DCI. The transmitting/receiving section 220 may receive low latency beam selection configuration information, confirmation information regarding the above measurement result, and the like from the base station 10.

The control section 210 may assume that, when low latency beam selection is configured by higher layer signaling, the same spatial domain filter is used for transmission of PDCCH at the base station 10 and transmission/reception (at least one of transmission and reception) of a specific channel at the base station 10.

The control section 210 may assume that the same downlink spatial domain transmission filter is used for transmission of PDCCH at the base station 10 and transmission of PDSCH at the base station 10.

The control section 210 may assume that the downlink spatial domain transmission filter used for transmission of PDCCH at base station 10 and the uplink spatial domain receive filter used for reception of PUCCH at base station 10 are the same.

The control section 210 may assume that, when low latency beam selection is configured by higher layer signaling, the downlink spatial domain receive filter of the user terminal 20 used for reception of PDCCH is the same as the downlink spatial domain receive filter of the user terminal 20 corresponding to the above-described transmitted latest measurement result.

The control section 210 may assume that the downlink spatial domain receive filter of the user terminal 20 used for reception of PDSCH is the same as the downlink spatial domain receive filter of the user terminal 20 used for reception of PDCCH.

The control section 210 may assume that the uplink spatial domain transmission filter of the user terminal 20 used for transmission of PUCCH is the same as the downlink spatial domain receive filter of the user terminal 20 used for reception of PDCCH.

When having low latency beam selection configured by higher layer signaling and receiving confirmation information (which may be referred to as beam report confirmation information, QCL assumption update indication, or the like) regarding the measurement result at time T, the control section 210 may assume that a spatial domain filter of a given channel (for example, PDCCH) after time (T+T2) when a second time has elapsed from the time T is the same as a spatial domain filter corresponding to the latest measurement result transmitted before time (T−T1) going back by a first time from the time T.

The assumption regarding these spatial domain filters may be assumption regarding the spatial domain filter of the user terminal 20 or assumptions regarding the spatial domain filter of the base station 10 that communicates with the user terminal 20.

The control section 210 may assume that the spatial domain filter of the given channel before the time (T+T2) when the second time has elapsed from the time T is the same as the spatial domain filter assumed before the timing of transmitting the latest measurement result transmitted before the time (T−T1) going back by the first time from the time T.

When a third time (T3) has elapsed after transmission of the measurement result, the control section 210 may assume that the spatial domain filter of the given channel is the same as the spatial domain filter corresponding to the measurement result even when the control section 210 has not received the confirmation information.

When a fourth time (T4) has elapsed after transmission of the measurement result and the control section 210 has not received the confirmation information before the elapse of the fourth time, the control section 210 may assume that the spatial domain filter of the given channel is the same as the spatial domain filter of the given channel (old QCL (beam)) before transmission of the measurement result.

(Hardware Configuration)

Note that the block diagrams used to describe the above embodiments illustrate blocks in functional units. These functional blocks (components) are implemented in an arbitrary combination with at least one of hardware and software. A method for implementing each of the functional blocks is not particularly limited. That is, each of the functional blocks may be implemented by using a physically or logically coupled single apparatus, or may be implemented by using directly or indirectly connected two or more physically or logically separate apparatuses (for example, using wires or radio). The functional blocks may be implemented by combining software with the above-described single apparatus or the above-described plurality of apparatuses.

Here, the function includes, but is not limited to, deciding, determining, judging, calculating, computing, processing, deriving, investigating, searching, ascertaining, receiving, transmitting, outputting, accessing, solving, selecting, choosing, establishing, comparing, assuming, expecting, considering, broadcasting, notifying, communicating, forwarding, configuring, reconfiguring, allocating, mapping, and assigning. For example, a functional block (component) that causes transmission to function may be referred to as a transmitting unit, a transmitter, or the like. In any case, as described above, the implementation method is not particularly limited.

Figure 15:
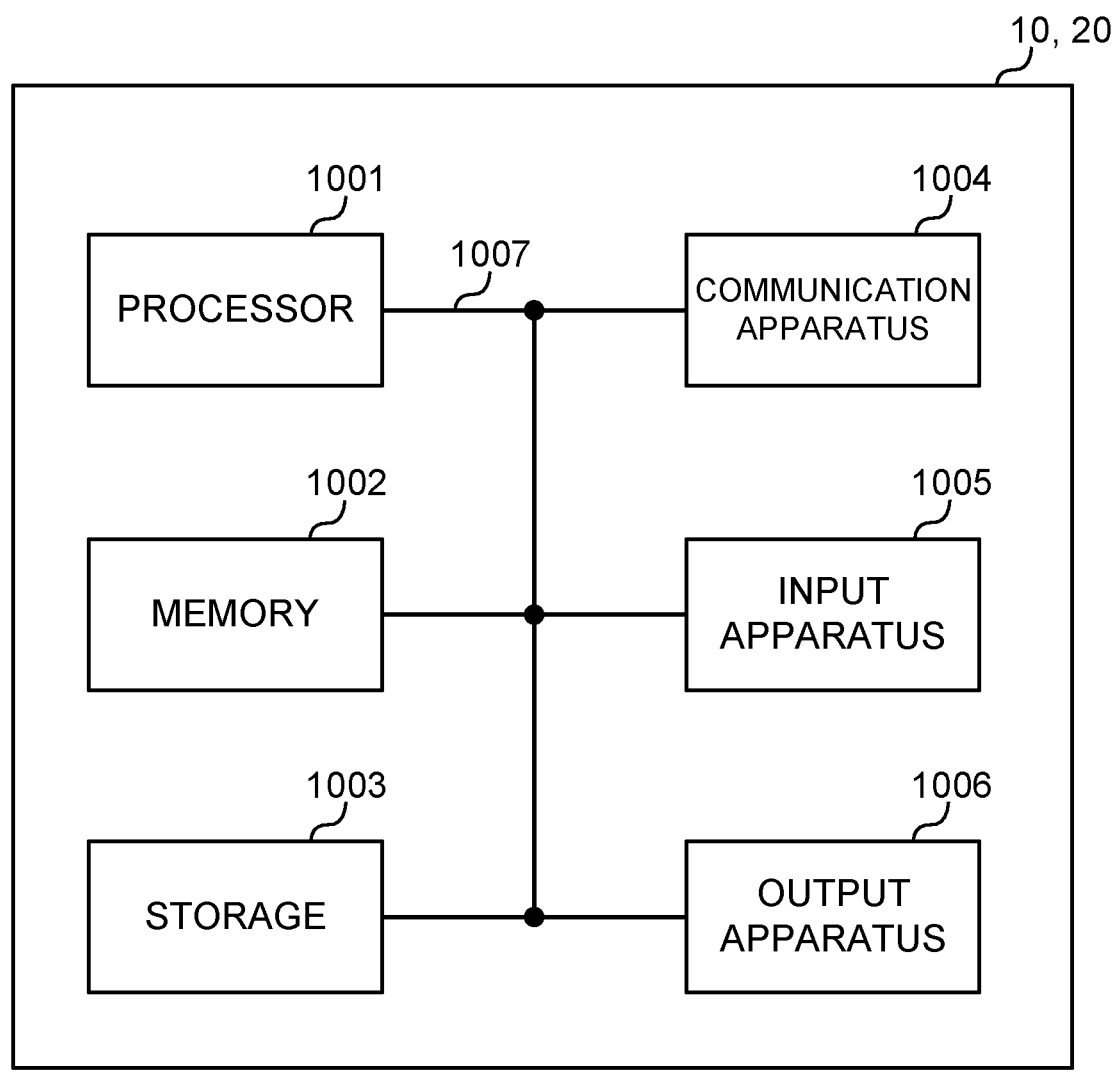
FIG. 15 is a diagram illustrating an example of a hardware configuration of a base station and a user terminal according to an embodiment.

For example, the base station, the user terminal, and the like according to an embodiment of the present disclosure may function as a computer that executes processing of the radio communication method of the present disclosure. FIG. 15 is a diagram illustrating an example of a hardware configuration of a base station and a user terminal according to an embodiment. Physically, the above-described base station 10 and user terminal 20 may be constituted as a computer apparatus including a processor 1001, a memory 1002, a storage 1003, a communication apparatus 1004, an input apparatus 1005, an output apparatus 1006, a bus 1007, and the like.

Note that in the present disclosure, the terms such as an apparatus, a circuit, an apparatus, a section, or a unit can be replaced with each other. The hardware configuration of the base station 10 and the user terminal 20 may include one or more apparatuses illustrated in the drawing, or does not have to include some apparatuses.

For example, although only one processor 1001 is illustrated, a plurality of processors may be disposed. Processing may be executed with one processor, or processing may be executed simultaneously, sequentially, or by using another method with two or more processors. Note that the processor 1001 may have one or more chips mounted thereon.

Each of functions of the base station 10 and the user terminal 20 is implemented by causing given software (program) to be read on hardware such as the processor 1001 or the memory 1002, thereby causing the processor 1001 to perform operation, controlling communication via the communication apparatus 1004, and controlling at least one of reading and writing of data in the memory 1002 and the storage 1003.

The processor 1001 controls the whole computer, for example, by operating an operating system. The processor 1001 may be constituted by a central processing unit (CPU) including an interface with peripheral equipment, a control apparatus, an operation apparatus, a register, and the like. For example, at least a part of the above-described control section 110 (210), transmitting/receiving section 120 (220), and the like may be implemented by the processor 1001.

The processor 1001 reads a program (program code), a software module, data, and the like from at least one of the storage 1003 and the communication apparatus 1004 into the memory 1002, and executes various types of processing according to these. As the program, a program to cause a computer to execute at least a part of the operation described in the above-described embodiment is used. For example, the control section 110 (210) may be implemented by a control program that is stored in the memory 1002 and operates in the processor 1001, and another functional block may be implemented similarly.

The memory 1002 is a computer-readable recording medium, and may be constituted by, for example, at least one of read only memory (ROM), erasable programmable ROM (EPROM), electrically EPROM (EEPROM), random access memory (RAM), and other appropriate storage media. The memory 1002 may be referred to as a register, a cache, a main memory (main storage apparatus), or the like. The memory 1002 can store, for example, a program (program code) that can be executed for performing a radio communication method according to an embodiment of the present disclosure or a software module.

The storage 1003 is a computer-readable recording medium, and may be constituted by, for example, at least one of a flexible disk, a floppy (registered trademark) disk, a magneto-optical disk (for example, a compact disc (compact disc ROM (CD-ROM)), a digital versatile disc, a Blu-ray (registered trademark) disk), a removable disk, a hard disk drive, a smart card, a flash memory device (for example, a card, a stick, or a key drive), a magnetic stripe, a database, a server, and other appropriate storage media. The storage 1003 may be referred to as an auxiliary storage apparatus.

The communication apparatus 1004 is hardware (transmission/reception device) for performing inter-computer communication via at least one of a wired network and a radio network, and is referred to as, for example, "network device", "network controller", "network card", or "communication module". The communication apparatus 1004 may include a high frequency switch, a duplexer, a filter, a frequency synthesizer, and the like in order to implement, for example, at least one of frequency division duplex (FDD) and time division duplex (TDD). For example, the transmitting/receiving section 120 (220), the transmitting/receiving antenna 130 (230), and the like described above may be implemented by the communication apparatus 1004. The transmitting/receiving section 120 (220) may be implemented by physically or logically separating the transmitting section 120*a* (220*a*) and the receiving section 120*b* (220*b*) from each other.

The input apparatus 1005 is an input device that receives input from the outside (for example, a keyboard, a mouse, a microphone, a switch, a button, or a sensor). The output apparatus 1006 is an output device that performs output to the outside (for example, a display, a speaker, or a light emitting diode (LED) lamp). Note that the input apparatus 1005 and the output apparatus 1006 may be integrated with each other (for example, a touch panel).

The apparatuses such as the processor 1001 and the memory 1002 are connected by the bus 1007 for communicating information. The bus 1007 may be constituted by a single bus, or may be constituted by buses that vary between apparatuses.

The base station 10 and the user terminal 20 may include hardware such as a microprocessor, a digital signal processor (DSP), an application specific integrated circuit (ASIC), a programmable logic device (PLD), or a field programmable gate array (FPGA), and some or all of the functional blocks may be implemented by the hardware. For example, the processor 1001 may be implemented with at least one of these pieces of hardware.

(Modification)

Note that terms described in the present disclosure and terms necessary for understanding the present disclosure may be replaced with other terms that have the same or similar meanings. For example, a channel, a symbol, and a signal (or signaling) may be replaced with each other. The signal may be a message. A reference signal can be abbreviated as RS, and may be referred to as a pilot, a pilot signal, or the like depending on a standard to be applied. A "component carrier (CC)" may be referred to as a "cell", a "frequency carrier", a "carrier frequency", or the like.

A radio frame may be constituted by one or more periods (frames) in a time domain. Each of the one or more periods (frames) constituting the radio frame may be referred to as a subframe. Furthermore, the subframe may be constituted by one or more slots in a time domain. The subframe may be a fixed period (for example, 1 ms) not dependent on numerology.

Here, numerology may be a communication parameter applied to at least one of transmission and reception of a given signal or channel. Numerology may indicate at least one of, for example, a subcarrier spacing (SCS), a bandwidth, a symbol length, a cyclic prefix length, a transmission time interval (TTI), the number of symbols per TTI, a radio frame configuration, specific filtering processing performed by a transceiver in a frequency domain, and a specific windowing processing performed by the transceiver in a time domain.

The slot may be constituted by one or more symbols (orthogonal frequency division multiplexing (OFDM) symbols, single carrier frequency division multiple access (SC-FDMA) symbols, and the like) in a time domain. The slot may be a time unit based on numerology.

The slot may include a plurality of mini slots. Each of the mini slots may be constituted by one or more symbols in a time domain. The mini slot may be referred to as a subslot. The mini slot may be constituted by fewer symbols than the slot. PDSCH (or PUSCH) transmitted in a time unit larger than the mini slot may be referred to as PDSCH (PUSCH) mapping type A. PDSCH (or PUSCH) transmitted using the mini slot may be referred to as "PDSCH (PUSCH) mapping type B".

The radio frame, the subframe, the slot, the mini slot, and the symbol all represent a time unit in signal transmission. The radio frame, the subframe, the slot, the mini slot, and the symbol may be referred to as other names corresponding thereto, respectively. Note that time units such as the frame, the subframe, the slot, the mini slot, and the symbol in the present disclosure may be replaced with each other.

For example, one subframe may be referred to as TTI, a plurality of consecutive subframes may be referred to as TTI, or one slot or one mini slot may be referred to as TTI.

That is, at least one of the subframe and TTI may be a subframe (1 ms) in the existing LTE, may be a period shorter than 1 ms (for example, one to thirteen symbols), or may be a period longer than 1 ms. Note that the unit to represent TTI may be referred to as the slot, the mini slot, or the like instead of the subframe.

Here, TTI refers to a minimum time unit of scheduling in radio communication, for example. For example, in an LTE system, scheduling is performed in which the base station allocates radio resources (frequency bandwidth that can be used in each user terminal, transmit power, and the like) to each user terminal in TTI units. Note that the definition of TTI is not limited thereto.

TTI may be a transmission time unit such as a channel-encoded data packet (transport block), a code block, or a codeword, or may be a processing unit such as scheduling or link adaptation. Note that, when TTI is given, a period of time (for example, the number of symbols) in which a transport block, a code block, a codeword, and the like are actually mapped may be shorter than the TTI.

Note that, when one slot or one mini slot is referred to as TTI, one or more TTIs (that is, one or more slots or one or more mini slots) may be a minimum time unit of scheduling. The number of slots (the number of mini slots) constituting the minimum time unit of the scheduling may be controlled.

TTI having a period of 1 ms may be referred to as usual TTI (TTI in 3GPP Rel. 8 to 12), normal TTI, long TTI, a usual subframe, a normal subframe, a long subframe, a slot, or the like. TTI shorter than normal TTI may also be referred to as shortened TTI, short TTI, partial TTI (or fractional TTI), a shortened subframe, a short subframe, a mini slot, a subslot, a slot, or the like.

Note that long TTI (for example, normal TTI or a subframe) may be replaced with TTI having a period exceeding 1 ms, and short TTI (for example, shortened TTI) may be replaced with TTI having a TTI duration less than the TTI duration of long TTI and equal to or more than 1 ms.

The resource block (RB) is a resource allocation unit in a time domain and a frequency domain, and may include one or more consecutive subcarriers in the frequency domain. The number of subcarriers included in RB may be fixed regardless of numerology, and may be 12, for example. The number of subcarriers included in RB may be determined based on numerology.

RB may include one or more symbols in a time domain, and may have a length of one slot, one mini slot, one subframe, or one TTI. One TTI, one subframe, and the like may be each constituted by one or more resource blocks.

Note that one or more RBs may be referred to as a physical resource block (PRB), a subcarrier group (SCG), a resource element group (REG), a PRB pair, an RB pair, or the like.

The resource block may be constituted by one or more resource elements (REs). For example, one RE may be a radio resource field of one subcarrier and one symbol.

A bandwidth part (BWP) (which may be referred to as a partial bandwidth or the like) may represent a subset of consecutive common resource blocks (RBs) for a given numerology in a given carrier. Here, the common RB may be specified by an RB index based on a common reference point of the carrier. PRB may be defined in a given BWP and may be numbered within the BWP.

BWP may include BWP for UL (UL BWP) and BWP for DL (DL BWP). For UE, one or more BWPs may be configured within one carrier.

At least one of the configured BWPs may be active, and UE does not have to assume that a given signal/channel is transmitted/received outside the active BWP. Note that a "cell", a "carrier", or the like in the present disclosure may be replaced with "BWP".

Note that the structures of the radio frame, subframe, slot, mini slot, symbol, and the like described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in RB, the number of symbols in TTI, the length of a symbol, and the length of a cyclic prefix (CP) can be variously changed.

The information, parameters, and the like described in the present disclosure may be represented using absolute values or relative values with respect to given values, or may be represented using other corresponding information. For example, a radio resource may be indicated by a given index.

Names used for parameters and the like in the present disclosure are not restrictive names in any respect. Furthermore, an equation and the like using these parameters may be different from those explicitly disclosed in the present disclosure. Since various channels (physical uplink control channel (PUCCH), physical downlink control channel (PDCCH), and the like) and information elements can be identified by any suitable names, various names assigned to these various channels and information elements are not restrictive names in any respect.

The information, signals, and the like described in the present disclosure may be represented by using any one of various different techniques. For example, data, instruction, command, information, a signal, a bit, a symbol, a chip, or the like that may be mentioned throughout the above description may be represented by voltage, current, electromagnetic wave, magnetic field or magnetic particles, optical field or photons, or an arbitrary combination thereof.

Information, a signal, and the like can be output in at least one of a direction from a higher layer to a lower layer and a direction from a lower layer to a higher layer. Information, a signal, and the like may be input/output via a plurality of network nodes.

The input/output information, signal, and the like can be stored in a specific location (for example, a memory) or can be managed using a management table. The input/output information, signal, and the like can be overwritten, updated, or appended. The output information, signal, and the like may be deleted. The input information, signal, and the like may be transmitted to another apparatus.

Notification of information may be performed not only by using the aspects/embodiments described in the present disclosure but also using another method. For example, notification of information in the present disclosure may be performed by using physical layer signaling (for example, downlink control information (DCI), uplink control information (UCI), higher layer signaling (for example, radio resource control (RRC) signaling, broadcast information (master information block (MIB), system information block (SIB), or the like), medium access control (MAC) signaling, another signal, or a combination thereof.

Note that physical layer signaling may be referred to as layer 1/layer 2 (L1/L2) control information (L1/L2 control signal), L1 control information (L1 control signal), and the like. RRC signaling may be referred to as an RRC message, and may be, for example, an RRC connection setup message or an RRC connection reconfiguration message. Notification of MAC signaling may be performed using, for example, a MAC control element (MAC CE).

Notification of given information (for example, notification of "being X") does not have to be performed explicitly but may be performed implicitly (for example, by not performing notification of the given information or by performing notification of another piece of information).

Judging may be performed in values represented by one bit (0 or 1), may be performed in Boolean values represented by true or false, or may be performed by comparing numerical values (for example, comparison with a given value).

Software should be widely interpreted to mean instruction, an instruction set, a code, a code segment, a program code, a program, a subprogram, a software module, an application, a software application, a software package, a routine, a subroutine, an object, an executable file, an execution thread, a procedure, a function, and the like regardless of whether being referred to as software, firmware, middleware, a microcode, and a hardware description language or referred to as another name.

Software, instruction, information, and the like may be transmitted/received via a communication medium. For example, when software is transmitted from a website, a server, or another remote source by using at least one of a wired technique (coaxial cable, optical fiber cable, twisted pair, digital subscriber line (DSL), or the like) and a radio technique (infrared rays, microwaves, and the like), at least one of the wired technique and the radio technique is included within the definition of a transmission medium.

The terms "system" and "network" used in the present disclosure can be used interchangeably. The "network" may mean an apparatus (for example, a base station) included in the network.

In the present disclosure, the terms such as "precoding", "precoder", "weight (precoding weight)", "quasi-co-location (QCL)", "transmission configuration indication (TCI) state", "spatial relation", "spatial domain filter", "transmit power", "phase rotation", "antenna port", "antenna port group", "layer", "layer number", "rank", "resource", "resource set", "resource group", "beam", "beam width", "beam angle", "antenna", "antenna element", and "panel" can be used interchangeably.

In the present disclosure, the terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. The base station may be referred to as a term such as a macro cell, a small cell, a femto cell, or a pico cell.

The base station can accommodate one or more (for example, three) cells. When the base station accommodates a plurality of cells, the entire coverage area of the base station can be partitioned into a plurality of smaller areas, and each smaller area can provide a communication service through a base station subsystem (for example, an indoor small base station (remote radio head (RRH))). The term "cell" or "sector" refers to a part or the whole of a coverage area of at least one of a base station and a base station subsystem that perform a communication service in this coverage.

In the present disclosure, the terms such as "mobile station (MS)", "user terminal", "user equipment (UE)", "terminal", and the like can be used interchangeably.

The mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other appropriate terms.

At least one of the base station and the mobile station may be referred to as a transmission apparatus, a reception apparatus, a radio communication apparatus, and the like. Note that at least one of the base station and the mobile station may be a device mounted on a moving object, a moving object itself, and the like. The moving object may be a vehicle (for example, a car or an airplane), an unmanned moving object (for example, a drone or an autonomous vehicle), or a robot (manned or unmanned). Note that at least one of the base station and the mobile station includes an apparatus that does not necessarily move during a communication operation. For example, at least one of the base station and the mobile station may be an Internet of Things (IoT) device such as a sensor.

The base station in the present disclosure may be replaced with a user terminal. For example, each aspect/embodiment of the present disclosure may be applied to a configuration in which communication between a base station and a user terminal is replaced with communication among a plurality of user terminals (which may be referred to as Device-to-Device (D2D), Vehicle-to-Everything (V2X), and the like). In this case, the user terminal 20 may have the above-described functions of the base station 10. The terms such as "uplink" and "downlink" may also be replaced with a term corresponding to inter-terminal communication (for example, "side"). For example, the uplink channel, the downlink channel, and the like may be replaced with a side channel.

Similarly, the user terminal in the present disclosure may be replaced with a base station. In this case, the base station 10 may have the above-described functions of the user terminal 20

In the present disclosure, an operation performed by the base station may be performed by an upper node thereof in some cases. In a network including one or more network nodes with base stations, it is clear that various operations performed for communication with a terminal can be performed by a base station, one or more network nodes (examples of which include but are not limited to mobility management entity (MME) and serving-gateway (S-GW)) other than the base station, or a combination thereof.

Each aspect/embodiment described in the present disclosure may be used singly, used in combination thereof, or switched depending on execution. The order of the processing procedure, the sequence, the flowchart, and the like in each aspect/embodiment described in the present disclosure may be changed as long as inconsistencies do not arise. For example, regarding the methods described in the present disclosure, elements of various steps are presented using an illustrative order, and are not limited to the presented specific order.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), future radio access (FRA), new radio access technology (New-RAT), new radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, and a next generation system expanded based on these. A plurality of systems may be combined (for example, a combination of LTE or LTE-A and 5G) and applied.

The phrase "based on" used in the present disclosure does not mean "based only on" unless otherwise specified. In other words, the phrase "based on" means both "based only on" and "based at least on".

Any reference to an element using designations such as "first" and "second" used in the present disclosure does not generally limit the amount or order of these elements. These designations can be used in the present disclosure as a convenient method for distinguishing two or more elements from each other. Therefore, reference to the first and second elements does not mean that only two elements are adoptable, or that the first element must precede the second element in some way.

The term "deciding (determining)" used in the present disclosure may encompass a wide variety of operations. For example, "deciding (determining)" may be considered as "deciding (determining)" of judging, calculating, computing, processing, deriving, investigating, looking up, search, or inquiry (for example, looking up in a table, database, or another data structure), ascertaining, and the like.

In addition, "deciding (determining)" may be considered as "deciding (determining)" of receiving (for example, receiving information), transmitting (for example, transmitting information), input, output, accessing (for example, accessing data in a memory), and the like.

In addition, "deciding (determining)" may be considered as "deciding (determining)" of resolving, selecting, choosing, establishing, comparing, and the like. In other words, "determining (deciding)" may be considered as "determining (deciding)" of some operation.

In addition, "deciding (determining)" may be replaced with "assuming", "expecting", "considering", or the like.

The terms "connected" and "coupled" used in the present disclosure or any variations thereof mean any direct or indirect connection or coupling between two or more elements, and may include presence of one or more intermediate elements between two elements "connected" or "coupled" to each other. Coupling or connection between elements may be physical, logical, or a combination thereof. For example, "connection" may be replaced with "access".

In the present disclosure, when two elements are connected to each other, it can be considered that these two elements are "connected" or "coupled" to each other by using one or more wires, cables, printed electrical connections, and the like, and as some non-limiting and non-inclusive examples, by using electromagnetic energy having wavelengths in a radio frequency domain, a microwave region, and a light (both visible and invisible) region.

In the present disclosure, a phrase "A and B are different" may mean "A and B are different from each other". Note that the term may mean "A and B are each different from C". The terms such as "separated" and "coupled" may be interpreted similarly to "be different".

In the present disclosure, when the terms "include" and "including", and variations thereof are used, these are intended to be inclusive similarly to the term "comprising". Furthermore, the term "or" used in the present disclosure is intended not to be an exclusive-OR.

In the present disclosure, when an article such as a, an, or the in English is added, the present disclosure may include that a noun following these articles is in the plural.

Although the invention according to the present disclosure has been described in detail above, it is obvious to a person skilled in the art that the invention according to the present disclosure is not limited to the embodiment described in the present disclosure. The invention according to the present disclosure can be implemented with corrections and in modification aspects without departing from the spirit and scope of the invention defined based on claims. Consequently, the description of the present disclosure is provided for the purpose of explaining examples, and should by no means be construed to limit the invention according to the present disclosure in any way.

The invention claimed is:

1. A terminal comprising:
 a receiver that receives a reference signal by applying a spatial domain filter for receiving the reference signal;
 a transmitter that transmits a latest measurement result of the reference signal to be measured, before a symbol at a first time previous to a symbol in which downlink control information (DCI) indicating confirmation information regarding the latest measurement result is received; and
 a processor that, if the received DCI includes a hybrid automatic repeat request (HARQ) process number and a new data indicator (NDI), and if a beam selection without transmission configuration indication state (TCI-state) is configured by higher layer signaling, performs a control to transmit a physical uplink control channel (PUCCH), subsequent to a symbol at a second time elapsed after the DCI indicating the confirmation information regarding the latest measurement result is received, by applying a same spatial domain filter as the spatial domain filter for receiving the reference signal of the transmitted latest measurement result,
 wherein the second time is based on numerology.

2. The terminal according to claim 1, wherein the measurement result is a latest measurement result that was transmitted before a symbol at a first time previous to the symbol in which the confirmation information was received.

3. A radio communication method for a terminal, comprising:
 receiving a reference signal by applying a spatial domain filter for receiving the reference signal;
 transmitting a latest measurement result of the reference signal to be measured, before a symbol at a first time previous to a symbol in which downlink control information (DCI) indicating confirmation information regarding the latest measurement result is received; and
 if the received DCI includes a hybrid automatic repeat request (HARQ) process number and a new data indicator (NDI), and if a beam selection without transmission configuration indication state (TCI-state) is configured by higher layer signaling, performing a control to transmit a physical uplink control channel (PUCCH), subsequent to a symbol at a second time elapsed after the DCI indicating the confirmation information regarding the latest measurement result is received, by applying a same spatial domain filter as the spatial domain filter for receiving the reference signal of the transmitted latest measurement result,
 wherein the second time is based on numerology.

4. A system comprising a terminal and a base station, wherein:
 the terminal comprises:
  a first receiver that receives a reference signal by applying a spatial domain filter for receiving the reference signal;
  a first transmitter that transmits a latest measurement result of the reference signal to be measured, before a symbol at a first time previous to a symbol in which downlink control information (DCI) indicating confirmation information regarding the latest measurement result is received; and a processor that, if the received DCI includes a hybrid automatic repeat request (HARQ) process number and a new data indicator (NDI), and if a beam selection without transmission configuration indication state (TCI-state) is configured by higher layer signaling, performs a control to transmit a physical uplink control channel (PUCCH), subsequent to a symbol at a second time elapsed after the DCI indicating the confirmation information regarding the latest measurement result is received, by applying a same spatial domain filter as the spatial domain filter for receiving the reference signal of the transmitted latest measurement result, wherein the second time is based on numerology, and the base station comprises:

a second receiver that receives the measurement result; and a second transmitter that transmits the reference signal and the confirmation information.

\* \* \* \* \*